(12) United States Patent
Saito et al.

(10) Patent No.: US 6,242,826 B1
(45) Date of Patent: *Jun. 5, 2001

(54) SPINDLE MOTOR AND DISC DRIVING APPARATUS COMPRISING THE SAME

(75) Inventors: Ikuaki Saito; Yoshifumi Shimogaki, both of Tottori-ken; Masafumi Higuchi; Noriatsu Goto, both of Yonago, all of (JP)

(73) Assignee: Matsushita Electric Industrial Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,217

(22) Filed: Jul. 27, 1999

(30) Foreign Application Priority Data

| Jul. 27, 1998 | (JP) | 10-210618 |
| Jul. 31, 1998 | (JP) | 10-217271 |
| Aug. 28, 1998 | (JP) | 10-243123 |
| Oct. 2, 1998 | (JP) | 10-280805 |
| Oct. 29, 1998 | (JP) | 10-308178 |

(51) Int. Cl.[7] .............. H02K 5/24; H02K 7/00; H02K 1/22; G11B 17/08; G11B 17/02

(52) U.S. Cl. ............ 310/51; 310/67 R; 310/267; 360/99.08; 360/99.12

(58) Field of Search ............... 310/51, 67 R, 310/90, 156, 261, 267; 360/99.04, 99.05, 99.07, 99.08, 99.12

(56) References Cited

U.S. PATENT DOCUMENTS

| 4,083,735 | * | 4/1978 | Caramanian | 156/64 |
| 4,501,984 | * | 2/1985 | Mishima | 310/261 |
| 5,317,464 | * | 5/1994 | Witt et al. | 360/99.08 |
| 5,422,776 | * | 6/1995 | Thorson et al. | 360/98.07 |
| 5,517,376 | * | 5/1996 | Green | 360/98.08 |
| 5,578,883 | * | 11/1996 | Sakashita et al. | 310/91 |
| 5,621,588 | * | 4/1997 | Williams et al. | 360/98.07 |
| 5,757,662 | * | 5/1998 | Dyer et al. | 364/508 |
| 5,894,183 | * | 4/1999 | Borchert | 310/261 |
| 5,956,205 | * | 9/1999 | Konno et al. | 360/99.02 |

FOREIGN PATENT DOCUMENTS

| 6-84560 | 12/1994 | (JP) . |
| 7-47983 | 11/1995 | (JP) . |
| 7-336982 | 12/1995 | (JP) . |
| 8-19229 | 1/1996 | (JP) . |
| 9-74705 | 3/1997 | (JP) . |

* cited by examiner

Primary Examiner—Nestor Ramirez
Assistant Examiner—Dang Dinh Le
(74) Attorney, Agent, or Firm—Parkhurst & Wendel, L.L.P

(57) ABSTRACT

The present invention relates to a spindle motor mainly used for an apparatus for driving a disc, which can increase the capacity of recorded information and the information transmission speed while reducing the size and thickness of the apparatus. This spindle motor corrects the balance of a structurally unbalanced chucking portion, and reduces the shaft deflection of a motor, non-uniform rotations, the inclination of a disc relative to a head, and the surface deflection of a disc loading portion.

4 Claims, 27 Drawing Sheets

$c = a \tan \alpha$
$d = (a-b) \tan \alpha$

SPINDLE MOTOR AND DISC DRIVING APPARATUS COMPRISING THE SAME

FIELD OF THE INVENTION

The present invention relates to a spindle motor mainly used for an apparatus for driving a disc.

BACKGROUND OF THE INVENTION

In recent years, in the field of disc driving apparatuses, the trend associated with information recording has been shifted from text-only information to text and video information, resulting in the need to increase the capacity of recorded information and the information transmission speed and to reduce the size and thickness of the apparatus.

The rotation speed of spindle motors built into disc driving apparatuses has also been increased, so techniques have become important that correct the balance of a rotating body to reduce vibration.

Conventional spindle motors for 3.5-inch floppy discs have a structurally unbalanced chucking portion. Due to the low rotation speed of conventional spindle motors, however, vibration has not particularly been considered to be a problem. A disc driving apparatus, however, has been designed and developed the speed and capacity of which are significantly increased using a conventional spindle motor. The spindle motor used for this apparatus must accommodate high rotation speeds despite the inclusion of a structurally unbalanced chucking section such as that described above.

In addition, the allowance limit on the shaft deflection of a spindle decreases with the increasing density of recorded information. Despite the trend toward an increase in vibration associated with the increased information transmission speed, however, it has become difficult to stably journal a shaft due to the reduced thickness of the motor. In these circumstances, techniques for reducing the shaft deflection of the motor are becoming more and more important.

To reduce the shaft deflection of the spindle, conventional spindle motors have been generally modified by improving the sizing accuracy for a bearing and a spindle to reduce their looseness. As a method for reducing the shaft deflection while meeting demands for reduced prices, the idea of magnetically applying an inclining moment to a rotor to intentionally incline a spindle during rotations has been known for a long time.

In addition, due to the advancing reduction of the size and thickness of a spindle motor, it is becoming more and more important to reduce the non-uniformity of rotations and to improve the position detection accuracy of the motor and the reliability associated with the mounting of an index magnet.

Conventional spindle motors for 3.5-inch floppy discs each comprise an index magnet on the outer circumference of a rotor; a coil, a magnetic resistance-varying element, and a Hall element opposed to the index magnet in proximity thereto; and an index signal generating mechanism for generating a one-pulse output upon each rotation of the spindle motor. This index signal is important due to its use for data writes to a disc or as a reference position signal for a read timing.

Due to the advancing reduction of the size and thickness, however, the index magnet is placed closer and closer to an FG signal detection circuit, so noise from the index magnet may rush into an FG signal to cause non-uniform rotations. Thus, there is a demand for improvement for preventing non-uniform rotations. Another problem is that the board thickness of a rotor case is reduced to hinder the operation of mounting the index magnet, thereby reducing the accuracy with which the index magnet is mounted and thus the reliability of mounting.

In addition, as described above, as a method for reducing the shaft deflection inexpensively, a metal shaft that is inexpensive is used to magnetically apply an inclining moment to the rotor to intentionally maintain the spindle inclined in a specified direction during rotations.

However, while efforts are being made to increase the rotation speed of the spindle motor and to reduce its size and thickness, the industry is requesting the deflection of disc tracks in the radial or axial direction to be reduced in order to improve the write and read capabilities of a head.

For magnetic disc driving apparatuses, it is becoming more and more important to reduce the whirling of a disc occurring while maintaining an inclination relative to the head in order to stably maintain the contact between the magnetic head and a magnetic recording medium. In addition, for disc apparatuses with an optical head, it is becoming more and more important to maintain the verticality between a disc and the optical axis of the optical head because beams projected from the optical head are subjected to reflection offset corresponding to an angle twice the inclination of the disc surface.

As described above, for spindle motors used for disc driving apparatuses, techniques for rotationally driving a disc without inclining it are becoming more and more important.

In addition, in spindle motors used for disc driving apparatuses, a disc loading portion is often provided on the rotor case, but the allowance limit on the surface deflection of the disc loading portion has been reduced to improve the write and read capabilities of the head. Accordingly, to further reduce the surface deflection of the disc loading portion, the rotor case must be fixed perpendicularly to the spindle that is a rotating shaft. The industry is also requesting to meet the requirements for fixation reliability, productivity, and costs.

An object of the present invention is to solve these problems to provide a spindle motor that can increase the capacity of recorded information and the information transmission speed while reducing the size and thickness of the apparatus.

DISCLOSURE OF THE INVENTION

A spindle motor according to this invention is a spindle motor comprising a rotor case having a first planar portion located on the inner circumferential side and a second planar portion formed into a lower step at the outer circumference of the first planar portion; a hub receiving table disposed at the center of the first planar portion so that a disc is loaded on the hub receiving table; a spindle provided at the center of the hub receiving table; a driving pin disposed on the top surface of the rotor case near the spindle, the spindle and the driving pin cooperating in rotationally driving a disc; a driving magnet installed on the inside of an outer circumferential portion of the rotor case; and a stator core being placed inside the rotor case in such a way that the outer circumferential end of the stator core is opposed to the driving magnet, characterized in that at least one weight is bind-fixed to the first planar portion of the rotor case.

As described above, since in the spindle motor according to this invention, the at least one weight is bind-fixed to the first planar portion of the rotor case, an unbalance caused by the asymmetric shapes of a disc and a chucking mechanism can be offset on a plane approximately identical to the plane of the disc and chucking mechanism. Besides, the spindle motor according to this invention can appropriately adjust the balance without effecting a couple and can reduce the amount of balance adjustment carried out by the second planar portion provided for precise balancing in order to simplify the balancing operation. Thus, this invention can provide an inexpensive spindle motor that is subjected to few vibrations.

The spindle motor according to this invention is characterized in that the weight is located on the rear surface of the rotor case. Thus, an existing empty space is used to eliminate the need of a new space. In addition, since the weight does not protrude out from the motor, disc chucking or head movement is not obstructed, thereby providing a small spindle motor.

The spindle motor according to this invention is characterized in that the weight bind-fixed to the rotor case is composed of a material of specific gravity 6 or more. Thus, the balance can be corrected within a limited space. In addition, larger-scale balance corrections can be carried out using a smaller weight to enable the periphery to be designed to be compact and thin. Consequently, a small and inexpensive motor can be implemented.

The spindle motor according to this invention is characterized in that a hole is formed in the second planar portion of the rotor case so as to act as a minus weight. This configuration can correct an unbalance due to asymmetric shapes caused by the non-uniform thickness of a flange portion at the outer end of the rotor case or by parts machining or assembly including the mounting of a PG magnet. As a result, the balance can be adjusted precisely to provide a spindle motor that is subjected to further reduced vibrations.

The spindle motor according to this invention is characterized in that the hole is formed by means of punching. Thus, a simple punch die can be used to punch the material in order to allow scraps to be processed more easily than in the processing of drilling chips, thereby simplifying the operation process.

The spindle motor according to this invention comprises on a motor plate a bearing, a stator having a plurality of radial salient poles around which coils are wound and a stator substrate conducting electricity to the coils, and comprising a spindle at the center of a rotor case and a rotor having a driving magnet magnetized into multiple poles on the inside of its outer circumferential portion, said rotor being rotatably journaled to said bearing, characterized in that a ferromagnetic body that attracts the rotor is partially opposed to the inner diameter surface of the driving magnet near an outer diameter portion of the stator and is disposed at a position not outside of the outer diameter of the stator.

According to this configuration, the attractive force between the ferromagnetic body and the magnetic poles of the driving magnet attracts the driving magnet toward the ferromagnetic body, thereby attracting toward the ferromagnetic body the spindle located at the center of the rotor. This configuration prevents the spindle and the bearing from loosening so that the rotor can be rotationally driven with reduced shaft deflection. Accordingly, without the need to increase the height of the motor, a thin spindle motor can be provided that can prevent the bearing from loosening and that is subjected to little shaft deflection. The ferromagnetic body is preferably an iron material that is an easily available ferromagnetic material.

The spindle motor according to this invention is characterized in that the end surface of the driving magnet magnetized into multiple poles is used for a frequency generator and in that magneto coil for the frequency generator is provided on the stator substrate opposite to the end surface of the driving magnet.

Accordingly, this configuration can provide a small, thin, and inexpensive spindle motor with a frequency generator and a speed control generator, the spindle motor reducing shaft deflection while obtaining frequency generation with a sufficient amplitude, without the need to increase the height of the motor or to add special magnet parts for the frequency generator.

The spindle motor according to this invention is characterized in that the stator and the ferromagnetic body are disposed with a gap approximately equal to the gap between the driving magnet and the stator. This configuration precludes a magnetic flux directed from the driving magnet to the tip of a salient pole of a stator core from flowing to the adjacent salient pole of the stator core via the ferromagnetic body, thereby preventing the driving performance of the motor from being adversely affected.

The spindle motor according to this invention is characterized in that projecting portions are provided in part of the ferromagnetic body and are each disposed in a slot portion between the adjacent salient poles of the stator. This configuration can increase the opposed area between the driving magnet and the ferromagnetic body to increase the magnetic attractive force, thereby obtaining an attractive force that attracts the spindle in a specified direction.

The spindle motor according to this invention is characterized in that the number of the projecting portions of the ferromagnetic body that are disposed in the slot portions is a integral multiple of the number of motor phases. Consequently, when the motor is rotationally driven, the effect of the projecting portion on magnetic fields equivalently appears in each phase to maintain the symmetry of driving in order to preclude torque ripples caused by the projecting portions from being deteriorated.

The spindle motor according to this invention is characterized in that the ferromagnetic body is fixed on the stator substrate by means of soldering, thereby allowing assembly operations to be preformed very easily than in, for example, the screw fixing method. In addition, in thin spindle motors, the protruding size of parts relative to the rear surface of the motor is sometimes strictly restricted to 0.05 mm or less, but this configuration requires no considerations for the screw mounting size associated with screw tightening or the mounting strength, thereby enabling thin spindle motors with reduced shaft deflection to be stably manufactured during the manufacturing process. The ferromagnetic body is an easily available iron ferromagnetic material, and a tin plate that is a solderable material is preferably used to mount the ferromagnetic body.

The spindle motor according to this invention is characterized in that the ferromagnetic body covers approximately one-eighth to half of the outer circumference of the stator. This configuration provides as a magnetic attractive force effected between the driving magnet and the ferromagnetic body, an appropriate force that attracts the spindle toward the ferromagnetic body. In general, in the scheme for attracting the spindle shaft in one direction, a lateral pressure effected on the bearing by the shaft causes a bearing loss, thereby increasing the current value of the motor. In thin motors, the driving magnet often comprises a strong magnet of rare earth, so a too strong attractive force between the driving magnet and the ferromagnetic body is likely to increase the motor current. By adjusting the circumferential length of the ferromagnetic body, a spindle motor can be implemented that can restrain shaft losses and that can prevent the shaft from loosening.

The spindle motor according to this invention has a rotor thereof for rotationally driving a disc and a stator for rotationally driving the rotor, the outer circumferential surface of the stator being opposed to the inner circumferential surface of an annular-ring-shaped driving magnet provided on the inner circumferential surface of the rotor, the rotor having on its outer circumference an index magnet so that an output from a magnetic detection means opposed to the outer circumference of the rotor in proximity thereto is used as an index pulse, wherein a square hole comprising two parallel sides in the rotating direction of the rotor and two sides perpendicular to this direction is provided at the outer circumference of the rotor and wherein the index magnet is inserted and mounted into the square hole.

Thus, a portion of the outer circumference that is located below the square hole and close to the stator substrate is not notched and thus acts as a shield plate for leakage fluxes from the index magnet. This configuration reduces the radii of magnetic fluxes flying toward the stator substrate to reduce the number of magnetic fluxes mingling with the FG coil on the stator substrate, thereby improving the S/N ratio of FG signals while reducing the non-uniform rotation of the spindle motor.

The spindle motor according to this invention is characterized in that recesses are provided in the corners of the square hole. Thus, the index magnet can be inserted and mounted into the square hole in such a way as to adhere to two adjacent sides of the square hole while preventing the corner of the square hole from interfering with the corner of the index magnet, thereby enabling the index magnet to be inserted and mounted without inclination. Consequently, the circumferential misalignment of the index magnet can be reduced to allow the correct rotating position of the rotor to be detected in order to improve the position detection accuracy.

The spindle motor according to this invention is characterized in that the recesses are reservoirs for an adhesive. Thus, adhesion is possible without the need to reduce the amount of adhesive, thereby increasing the adhesion strength to provide a spindle motor that enables reliable adhesion. In addition, the reservoirs provide spaces that accommodate an adhesive to preclude its unwanted extension, thereby eliminating the need to wipe the extended adhesive to realize an inexpensive spindle motor.

The spindle motor according to this invention is characterized in that the index magnet has in its lateral surface V-shaped grooves acting as reservoirs for an adhesive. Consequently, adhesion is possible without the need to reduce the amount of adhesive, thereby increasing the adhesive strength to improve the reliability of adhesion.

The spindle motor according to this invention is characterized in that the front and rear surfaces of the index magnet have opposed polarities and each have a single magnetized pole and in that the magnetized polarity of the inner circumferential surface of the driving magnet positioned in the square hole is opposite to the magnetized polarity of the surface of the index magnet. Accordingly, due to the opposite polarities of the rear surface of the index magnet and the outer circumferential surface of the driving magnet, these surfaces attract each other to prevent the index magnet from shifting from the position at which it is inserted and mounted. As a result, the index magnet can be very easily stuck and fixed to a specified position to reduce the circumferential misalignment, thereby enabling the correct rotating position of the rotor to be detected to increase the position detection accuracy.

The spindle motor according to this invention is characterized in that the boundary portion between the magnetized poles of the driving magnet exists approximately at the center of the square hole formed in the rotor, and in that the index magnet has two magnetized poles on each of the front and rear surfaces and is provided in the square hole. Thus, the index magnet is inserted and mounted by aligning the magnetized boundary portion of the index magnet with the magnetized boundary portion of the driving magnet so as to provide opposite polarities. Consequently, the index magnet and the driving magnet attract each other to prevent the index magnet from shifting from the position at which it is inserted and mounted. As a result, the index magnet can be very easily stuck and fixed to a specified position to reduce the circumferential misalignment of the index magnet, thereby enabling the correct rotating position of the rotor to be detected to increase the position detection accuracy.

This invention provides a spindle motor having a rotor for rotationally driving a disc loaded on a disc loading portion, a stator for rotationally driving the rotor, a spindle bind-fixed to the center of said disc loading portion, said spindle being rotatably journaled to a metal bearing, and comprising an inclining means for inclining the spindle in a specified direction relative to the bearing, characterized in that three mounting portions are provided on a motor plate, in that a line orthogonal with a line joining two of the three mounting portions extends in the same direction as the inclination of the spindle, and in that the spindle exists inside a triangle comprising the three mounting portions.

Thus, since the motor plate has the three mounting portions for a motor mounting member, the inclination of the plane is determined by these three mounting portions to stabilize the mounting of the spindle motor. The line orthogonal with the line joining two of the three mounting portions extends in the same direction as the inclination of the spindle, so that the clearance between the spindle and the metal is eliminated, thereby reducing the deflection of the spindle and restraining whirling. In addition, by changing the height of the one remaining mounting portion relative to the height of the two mounting portions, calculations can be significantly simplified that are required to make the disc loading surface parallel with the motor mounting member. Accordingly, the disc loading surface can be parallelized to reduce the deflection of disc tracks in order to enable very easy design of a spindle motor. With a head having high write and read capabilities. Besides, since the spindle exists inside the triangle formed of the three mounting portions, the variation of the height of the disc loading surface is restrained despite vibration caused by the motor to improve the reliability of writes and reads executed by the head.

The spindle motor according to this invention is characterized in that four mounting portions are provided on the motor plate, in that two of the mounting portions are provided on each of two lines orthogonal with the inclining direction of the spindle, and in that the spindle exists inside a rectangle enclosed by the four mounting portions.

Thus, since the motor plate has the four mounting portions for the motor mounting member, even a heavy motor can be reliably mounted on the plate. In addition, since two of the mounting portions are provided on each of the two lines orthogonal with the inclining direction of the spindle, no mounting portion exists on a line extending in the inclining direction of the spindle. Consequently, no obstruct exists in this direction to enable the head or a head moving mechanism to be disposed in proximity to the rotor of the motor, thereby facilitating the design of a smaller head moving mechanism. In addition, the two pairs of mounting portions have an identical height, so calculations can be simplified that are required to make the disc loading portion parallel with the motor mounting member. As a result, the deflection of disc tracks can be reduced to enable very easy design of a spindle motor with a head having high write and read capabilities. In addition, since the spindle exists inside the rectangle comprising the four mounting portions, the variation of the height of the disc loading surface is restrained despite vibration caused by the motor to improve the reliability of writes and reads executed by the head.

The spindle motor according to this invention is characterized in that the mounting portion comprises height correction means of two type sizes to enable the disc loading surface to be mounted parallel with the motor mounting member.

Thus, the three or four mounting portions provided on the motor plate need not include respective height correction means of different sizes. That is, the height correction means of two types of heights can be used to mount the disc loading surface parallel with the motor mounting member, thereby providing a spindle motor that requires a smaller number of parts, that is easy to manage, and that requires low costs.

According to the spindle motor of this invention, the motor plate is a printed circuit board, and the height of the mounting portions is adjusted using a copper foil or a resin paint print, thereby enabling the disc loading surface to be mounted parallel with the motor mounting member.

Thus, the height can be adjusted depending on the presence of a copper foil or a resin paint print of solder resist ink in the printed circuit board, so the height can be changed without using separate members. Consequently, the disc loading surface can be mounted parallel with the motor mounting member without the need to increase costs.

The spindle motor of this invention comprises a spindle including a plurality of circumferential grooves in its outer circumferential surface, and a rotor case having an inner circumferential cylindrical portion at its center and having a disc loading portion on which a recording disc is mounted, the plurality of circumferential grooves comprising two types of grooves of different widths or depths, the spindle being press-fitted in the rotor case so that the circumferential grooves in the spindle are opposed to the inner circumferential cylindrical portion of the rotor case, the spindle being then bind-fixed using an adhesive.

According to this configuration, the spindle motor according to this invention provides a spindle holding strength based on the adhesive to enable the press-fitting interference to be reduced. Accordingly, the distortion of the inner circumferential cylindrical portion caused by press-fitting can be reduced to enable the manufacture of a spindle motor that can reduce the deflection of the disc loading portion. In addition, this configuration has the extra adhesive holding grooves, so the adhesive does not flow into the bearing as foreign matter, thereby providing a spindle motor that allows the spindle to be reliably bind-fixed.

The spindle motor of this invention comprises a spindle including a plurality of circumferential grooves in its otter circumferential surface and a rotor case having an inner circumferential cylindrical portion at its center and having a disc loading portion on which a recording disc is mounted, the spindle being press-fitted in the rotor case so that the circumferential grooves in the spindle are opposed to the inner circumferential cylindrical portion of the rotor case and so that part of each circumferential groove in the axial direction is exposed from one end of the inner circumferential cylindrical portion, the spindle being then bind-fixed using an adhesive.

As described above, since the circumferential grooves are located so that at least part of each circumferential groove in the axial direction is exposed from one edge of the inner circumferential cylindrical portion, the amount of extra adhesive retained is increased to ensure that the adhesive is prevented from flowing out to a sliding portion of the bearing. In particular, the circumferential grooves can retain extra adhesive resulting from a reduced spindle diameter and the resulting variable amount of adhesive applied, so this configuration is more effective on smaller spindle motors. In addition, by coloring the adhesive red or blue, the adhesive application condition can be visually inspected to check whether the correct adhesion operation has been performed, thereby providing a spindle motor that allows the spindle to be reliably bind-fixed.

Furthermore, an adhesive applied to the spindle prior to the press-fitting operation acted as a lubricant to restrain resistance to the press fitting, contributing to preventing the deflection of the disc loading portion. This effect was unexpected.

The spindle motor of this invention comprises a spindle including in its outer circumferential surface a plurality of circumferential grooves and a plurality of vertical grooves linked to the circumferential grooves; and a rotor case having an inner circumferential cylindrical portion at its center and having a disc loading portion on which a recording disc is mounted, the spindle being press-fitted in the rotor case so that the circumferential grooves in the spindle are opposed to the inner circumferential cylindrical portion of the rotor case, so that part of each circumferential groove in the axial direction is exposed from one end of the inner circumferential cylindrical portion, and so that part of each vertical groove in the axial direction is exposed from the other end of the inner circumferential cylindrical portion, the spindle being then bind-fixed using an adhesive.

The spindle motor of this invention comprises a spindle including a plurality of circumferential grooves in its outer circumferential surface and a rotor case having an inner circumferential cylindrical portion at its center and having a disc loading portion on which and a plurality of vertical grooves in the inner circumferential cylindrical portion and on which a recording disc is mounted, the spindle being press-fitted in the rotor case so that the circumferential grooves in the spindle are opposed to the inner circumferential cylindrical portion of the rotor case and so that part of each circumferential groove in the axial direction is exposed from one end of the inner circumferential cylindrical portion, the spindle being then bind-fixed using an adhesive.

As described above, by using the vertical grooves provided in the spindle or in the inner circumferential cylindrical portion and injecting an adhesive in these grooves after the spindle has been press-fitted in the inner circumferential cylindrical portion, the adhesive can be applied and prevented from adhering to unwanted positions. Accordingly, the adhesion operation becomes very easy to reduce the deflection of the disc loading portion, thereby inexpensively providing a small thin spindle motor that enables reliable adhesion.

This invention also configures a disc driving apparatus comprising the above spindle motor. Thus, it can provide an inexpensive disc driving apparatus with a head having excellent write and read capabilities.

DESCRIPTION OF THE EMBODIMENTS

Embodiment 1

Figure 1:
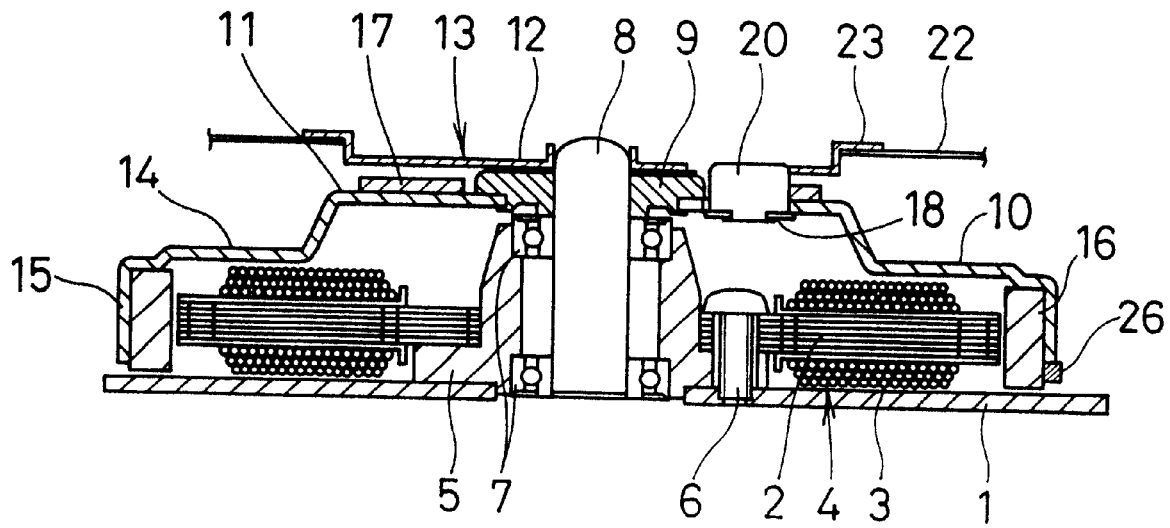
FIG. 1 is a sectional view of a conventional spindle motor.
Figure 2:
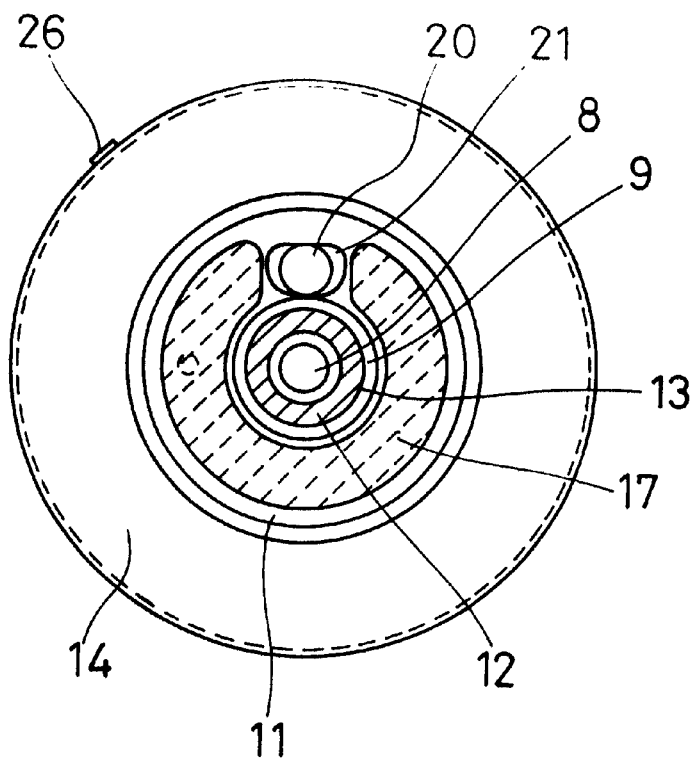
FIG. 2 is a plan view of a rotor portion of the conventional spindle motor.
Figure 3:
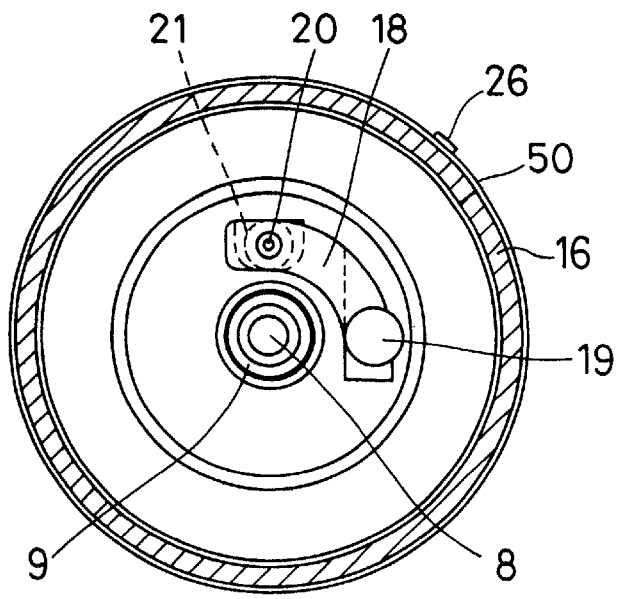
FIG. 3 is a bottom view of the rotor portion of the conventional spindle motor.
Figure 4:
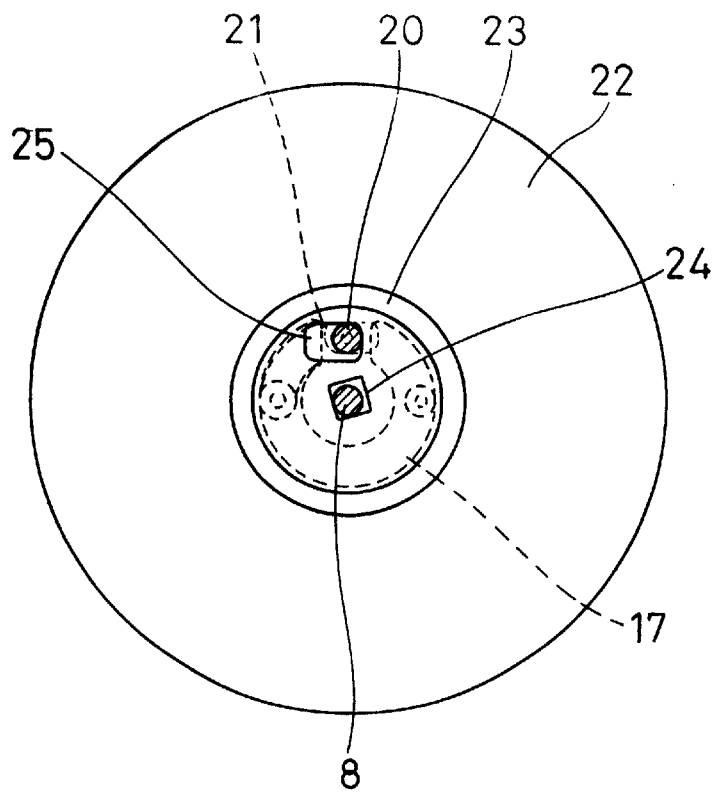
FIG. 4 shows how to use the spindle motor.

FIG. 1 shows a sectional view of a spindle motor according to the prior art. FIG. 2 shows a plan view of a rotor of this spindle motor. FIG. 3 shows a bottom view of the rotor. FIG. 4 shows an explanatory drawing describing a disc chucking state.

In FIG. 1, a stator 4 consisting of a stator core 2 having a plurality of salient poles and around which coils 3 are wound is mounted at the center of a motor plate 1 together with a bearing housing 5, using screws 6. Ball bearings 7 are fittingly attached to the inner wall of the bearing housing 5, and a spindle 8 is inserted and mounted into the ball bearings 7 in such a way as to be rotatably journaled thereto. A rotor boss 9 is press-fitted on the spindle 8, and a first planar portion 11 existing on the inner circumferential side of a rotor case 10 is fixed to the rotor boss 9. A resin slide sheet 12 having a small friction coefficient is stuck to the top surface of the rotor boss 9 to constitute a hub receiving table 13.

In addition, on the outer circumferential side of the first planar portion 11 of the rotor case 10, a second planar portion 14 formed into a lower step extends from the first planar portion 11, and a flange portion 15 is formed at the outer circumferential end of the second planar portion 14. A driving magnet 16 magnetized into multiple poles and opposed to the outer circumferential portion of salient poles on the stator 4 is provided on the inner circumferential wall of the flange portion 15.

In FIG. 2, a C-shaped hub magnet 17 having a magnetized surface is mounted on the first planar portion 11 of the rotor case 10.

In FIG. 3, one end of a chuck plate 18 formed of a thin plate spring is mounted on the rear surface of the first planar portion 11 of the rotor case 10 using a strut 19 so that the chuck plate can be swiveled around the strut 19. A driving pin 20 is caulked and fixed to the other end of the chuck plate 18. The driving pin 20 protrudes from a driving pin hole 21 provided in the first planar portion 11 of the rotor case 10.

As shown in FIG. 4, a disc hub 23 provided at the center of a disc 22 is formed of a ferromagnetic material, a square hole 24 is formed at the center of the disc hub 23, and a driving hole 25 is formed at a biased position in an outer circumferential portion of the square hole 24.

When the disc 22 is inserted into the disc driving apparatus, the coils 3 are provided with electricity through a control circuit (not shown) to rotationally drive the rotor. The spindle 8 is inserted into the square hole 24 in the disc hub 23. As the disc driving portion rotates, the driving pin 20 is inserted into the driving hole 21. The side wall of the square hole 24 and the spindle 8 adhere to each other at two contact surfaces (see FIG. 4) while the side wall of the driving hole 25 and the driving pin 20 adhere to each other at two contact surfaces to complete chucking. The disc hub 23 is attracted to the hub magnet 17 and stably loaded on the hub receiving table 13, and the spindle 8 and the driving pin 20 cooperate in rotating the disc 22 on the hub receiving table 13. In addition, a PG magnet 26 is attached to the outer end of a flange portion of the rotor case 10, and cooperates with a PG sensor (not shown) in generating one PG signal in response to one rotation of the rotor. The above configuration is known as a conventional spindle motor for 3.5-inch floppy discs.

According to such a configuration, in the rotor with the disc loaded thereon, the disc hub 23 is unbalanced. The hub magnet 17, the driving pin hole 21 in the rotor case 10, the driving pin 20, the chuck plate 18, and the strut 19 are in unstable positions. Thus, this configuration has a critical problem for a disc apparatus wherein the spindle motor vibrates during fast rotations to hinder the head of the disc apparatus from reading or writing signals.

A general means for adjusting the balance to reduce vibration has been a method for attaching a balance plate to the rotor case and drilling a hole in the balance plate so that the plate acts as a minus weight, or attaching a plus weight using a putty or an adhesive. This method, however, requires large separate parts and degrades workability as in heat-or ultraviolet-setting binding of the weight, thereby increasing costs.

An example of an attempt to solve this problem is described in JP A8-19229. This invention is an example of a polygon scanner motor wherein the outer circumferential portion of a rotor case is folded outward into a U-shaped groove, in which a balance weight is provided in order to establish a balance inexpensively. If, however, this method is applied to a floppy disc spindle motor, the outer diameter of the rotor increases by a value corresponding to the size of the U-shaped groove, thereby precluding the head from being accessed for data reads and writes.

This embodiment solves the above problem, that is, vibration in a spindle motor for driving a disc, having an unbalanced element, that is, an unbalanced disc hub. Besides, this embodiment achieves the object to provide a compact and inexpensive spindle motor, thereby achieving the increased capacity and speed of a disc driving apparatus.

Embodiment 1 that has achieved this object will be described below.

Figure 5:
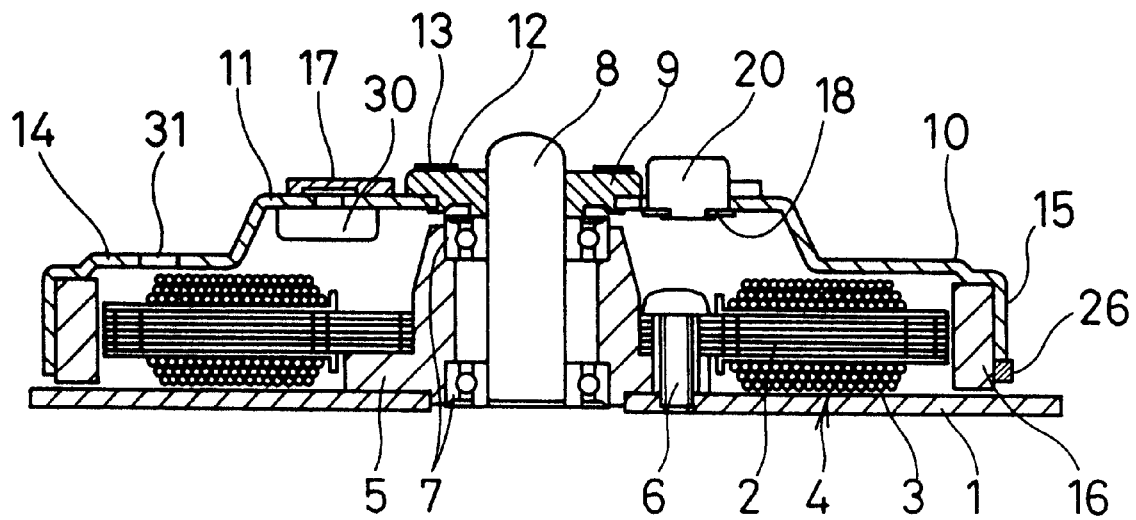
FIG. 5 is a sectional view of a spindle motor according to this invention.
Figure 6:
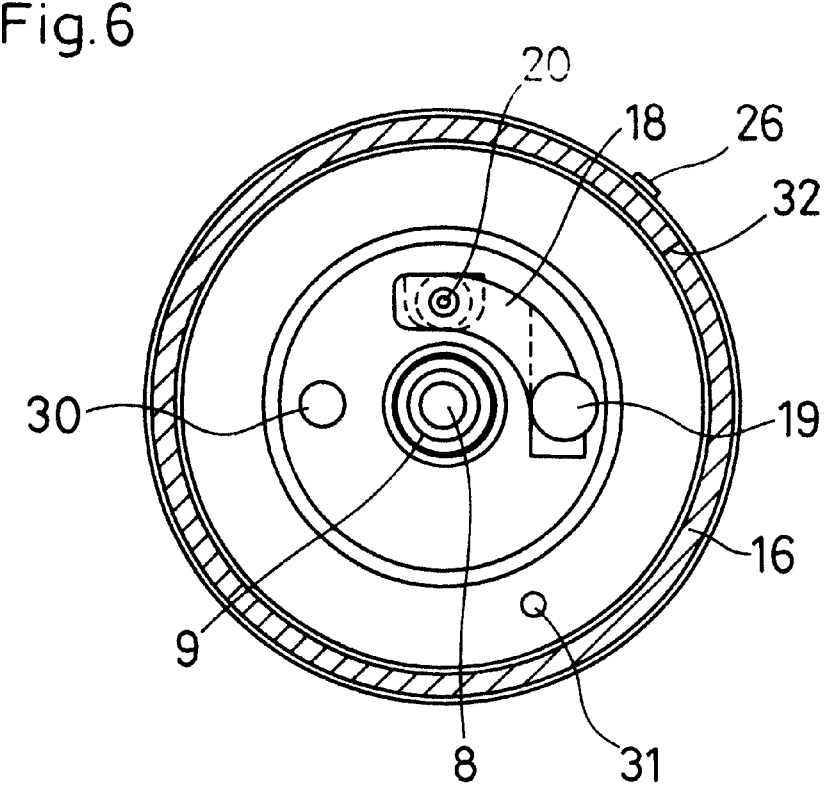
FIG. 6 is a bottom view of a rotor portion of the spindle motor according to this invention.
Figure 7:
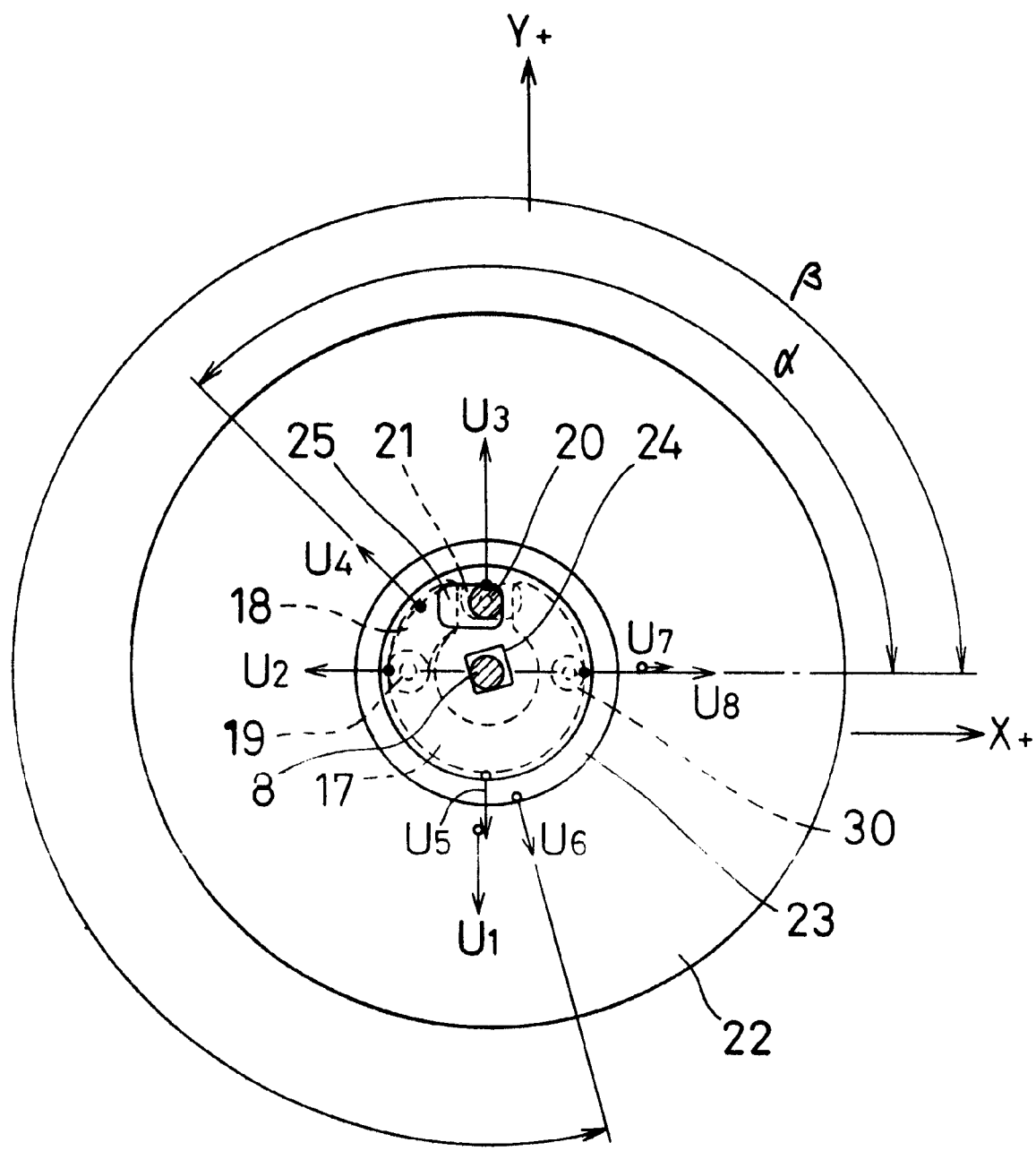
FIG. 7 is an explanatory drawing describing balance corrections executed by the spindle motor according to this invention.

FIG. 5 is a sectional view of a spindle motor according to Embodiment 1. FIG. 6 is a bottom view of a rotor. FIG. 7 is an explanatory drawing describing balance corrections. In these figures, the same components as in the above conventional example have the same reference numerals, and their description is omitted.

According to this embodiment, a weight 30 is bind-fixed to the first planar portion 11 of the rotor case 10. Since the weight 30 is bind-fixed to the same plane as the chucking portion, an unbalance attributable to the asymmetric shapes of the disc and chucking portion can be canceled on approximately the same plane as the chucking mechanism, thereby preventing a couple to enable appropriate balance adjustments.

The mounting position and weight of the weight 30 will be explained with reference to FIG. 7. This figure is a plan view of a state in which a disc is loaded on a disc chucking portion of a spindle motor. The unbalance quantity of the disc chucking portion is represented by the following symbols, and places in which unbalance exists and the magnitude of the unbalance are represented as vector quantities using the direction and length of arrows. Embodiment 1 calculates unbalance as a centralized mass. The unbalance quantity below is in the unit of mgcm. (Indicated by 1 mgcm is a state where, for example, the mass of 1 mgcm is at a position 1 cm distant radially from the center of the planar portion of the rotor core.)

U1: driving pin hole in the rotor case=104
U2: strut=98
U3: driving pin=183
U4: chuck plate=103
U5: hub magnet=75
U6: disc hub=75
U7: strut mounting hole in the rotor case=9
U8: balance adjustment weight=25
Angle of U4α=135°, angle of U6β=285°

In FIG. 7, if the unbalance quantity is divided into X- and Y-direction components and the sum of the unbalance quantities of the respective components is calculated, then X=−143 mgcm and Y=5 mgcm. According to Embodiment 1, since the unbalance quantity in the Y direction is small, the weight 30 was mounted at a position at which it can cancel the unbalance quantity in the X direction. Thus, the balance adjustment weight 30 U8 was provided in the +X direction. According to Embodiment 1, by mounting a brass weight 30 of φ4×1.3 t, the following unbalance quantities were obtained: X=−5 mgcm, Y=5 mgcm.

Although in Embodiment 1, the weight 30 was mounted at the position at which it could cancel the unbalance quantity in the X direction because the unbalance quantity was small in the Y direction, the unbalance quantities in the X and Y directions may be vector-synthesized so that a single weight can be mounted at a predetermined position. In addition, if balance corrections are impossible with a single weight, a plurality of weights may be provided on the X or Y axis or at appropriate positions.

By correcting the balance using approximately the same plane as the chucking mechanism, only a small couple is generated to enable appropriate balance adjustments. In addition, for an excellent and precise balance, if the second planar portion 14 is used for balance adjustments, the amount of adjustments in a balance correction step is reduced to simplify the balancing operation in order to provide a spindle motor having a high productivity and subjected to low vibration.

According to Embodiment 1, the weight 30 is placed on the rear surface of the first planar portion 11 of the rotor case 10 in such as way as to be caulked and fixed to the rotor case 10. No new space is required due to the use of an existing empty space on the rear surface of the planar portion 11. No component protrudes out from the motor to prevent disc chucking or head movement from being obstructed, thereby providing a compact disc driving apparatus.

Next, the weight 30 bind-fixed to the rotor case 10 comprises brass of specific gravity 8.46. Thus, the weight was accommodated in the predetermined empty space on the rear surface of the planar portion 11. For example, when aluminum of specific gravity 2.7 was used, the weight 30 had a thickness of 4 mm and could not be accommodated in the predetermined space according to Embodiment 1. By selecting a material having a large specific gravity of 6 or more, a weight of a small volume can be used to carry out large-scale balance corrections, thereby enabling a small and compact motor to be designed by reducing the thickness of the periphery.

In addition, according to Embodiment 1, after the rotor has been assembled, a balance measuring apparatus is used to measure the balance of the rotor, and a hole 31 is formed in the second planar portion 14 of the rotor case 10 using a simple metal mold. The hole 31 acts as a minus weight to correct an unbalance caused by parts machining or assembly such as the non-uniform thickness of the flange portion 15 at the outer end of the rotor case 10 or the unbalance quantity of the mounting portion for the PG magnet 26. The quantity of such an unbalance was about 50 mgcm, and in this embodiment, one hole of φ2.2 was provided to carry out a correction corresponding to 30 mgcm to reduce the unbalance quantity down to 20 mgcm. In this manner, the practically sufficient unbalance correction was achieved.

Thus, since the hole 31 formed in the second planar portion 14 has a large radius from the rotation center, even the single hole 31 enable balance corrections to simplify the balancing operation.

In addition, the second planar portion 14 is approximately on the same plane as the portions in which the above unbalance occurs, so the generation of a couple can be reduced to enable precise balance adjustments. Besides, no component protrudes out from the motor to preclude head movement from being obstructed, thereby providing a motor subjected to further reduced vibration. The elongated driving magnet 16 is shaped like an annulus ring and incorporated in the rotor, as shown in FIG. 6. In order to determine a specified unbalance direction prior to assembly, a both-end aligning portion 32 of the driving magnet 16 is incorporated in the frame 10 so as to be placed at a specified position relative to the circumferential direction of the rotor case 10.

According to Embodiment 1, the hole 31 is formed by means of punching. Scraps are obtained by sucking them through the metal mold. Thus, compared to drilling chips processing, no scraps splash to allow the balance correction operation to be performed very easily, thereby simplifying the operation process. Consequently, this embodiment reduces costs while improving quality.

The balance correction according to this invention requires no large balance plate and allows the weight to be bind-fixed easily. It also allows precise balancing operations to be performed very easily to enable balance corrections inexpensively.

This invention is not limited to the above embodiment, but can be subjected to various applications and developments without deviating from the scope of the spirits of the invention.

Embodiment 2

Figure 8:
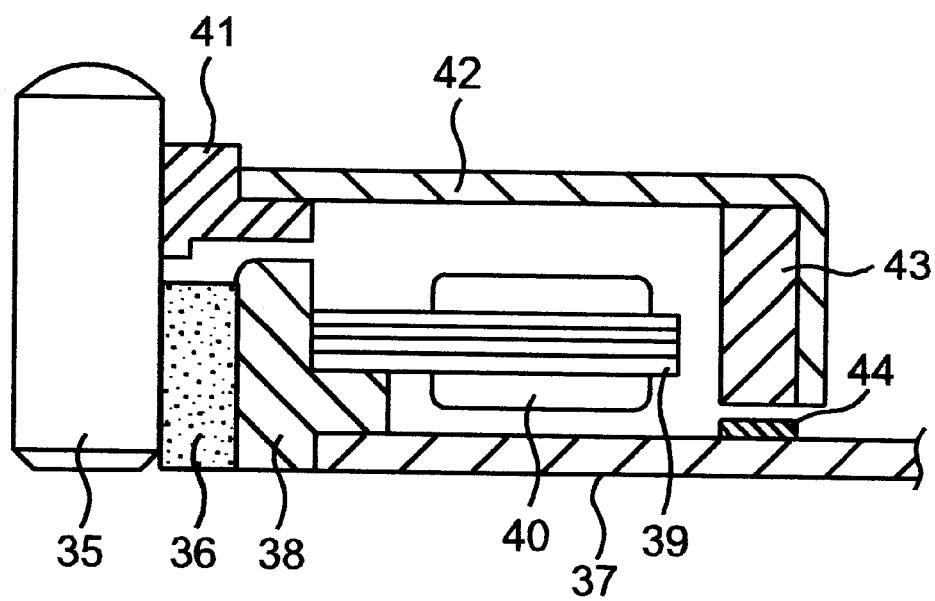
FIG. 8 is a half-sectional view showing a conventional spindle motor.

FIG. 8 is a half-sectional view showing the conventional spindle motor disclosed in JP A7-336982. A spindle 35 is journaled to the center of this spindle motor by means of a bearing 36. The bearing 36 is mounted on a bearing housing 38 provided on a motor plate 37. Coils 40 are wound around salient poles of a stator core 39. In addition, a rotor case 42 is fixed to a rotor boss 41, and a driving magnet 43 is mounted on the outer circumferential portion of the rotor case 42. Electricity is conducted through the coils 40 to rotationally drive the magnet 43 in order to rotate the rotor case 42 and the spindle 35.

One magnetic substance 44 is provided on the motor plate 37 and under the driving magnet 43 so as to form a magnetic circuit that connects the driving magnet 43, the magnetic substance 44, and the salient pole of the spindle 35. This configuration causes inclination toward the mounted magnetic substance 44 to constantly rotate the spindle 35 in order to restrain shaft deflection.

According to this configuration, however, the magnetic substance 44 mounted on the motor plate 37 practically requires a thickness of about 0.5 mm, thereby requiring the height of the motor to be increased by a value corresponding to the thickness of the magnetic substance 44. As a result, this configuration cannot meet the recent requirement for the reduction of the motor thickness.

In addition, to obtain a frequency generating signal for controlling the rotation speed of the spindle motor, a coil for a frequency generator (not shown) is placed on the motor plate 37 and opposite to the driving magnet 43 in order to magnetize the driving magnet 43 into multiple poles for the frequency generator. When, however, the magnetic substance 44 is mounted on the motor plate 37, the gap between them increases by a value corresponding to the thickness of the magnetic substance to preclude a frequency generating signal of a sufficient amplitude from being obtained.

Figure 9:
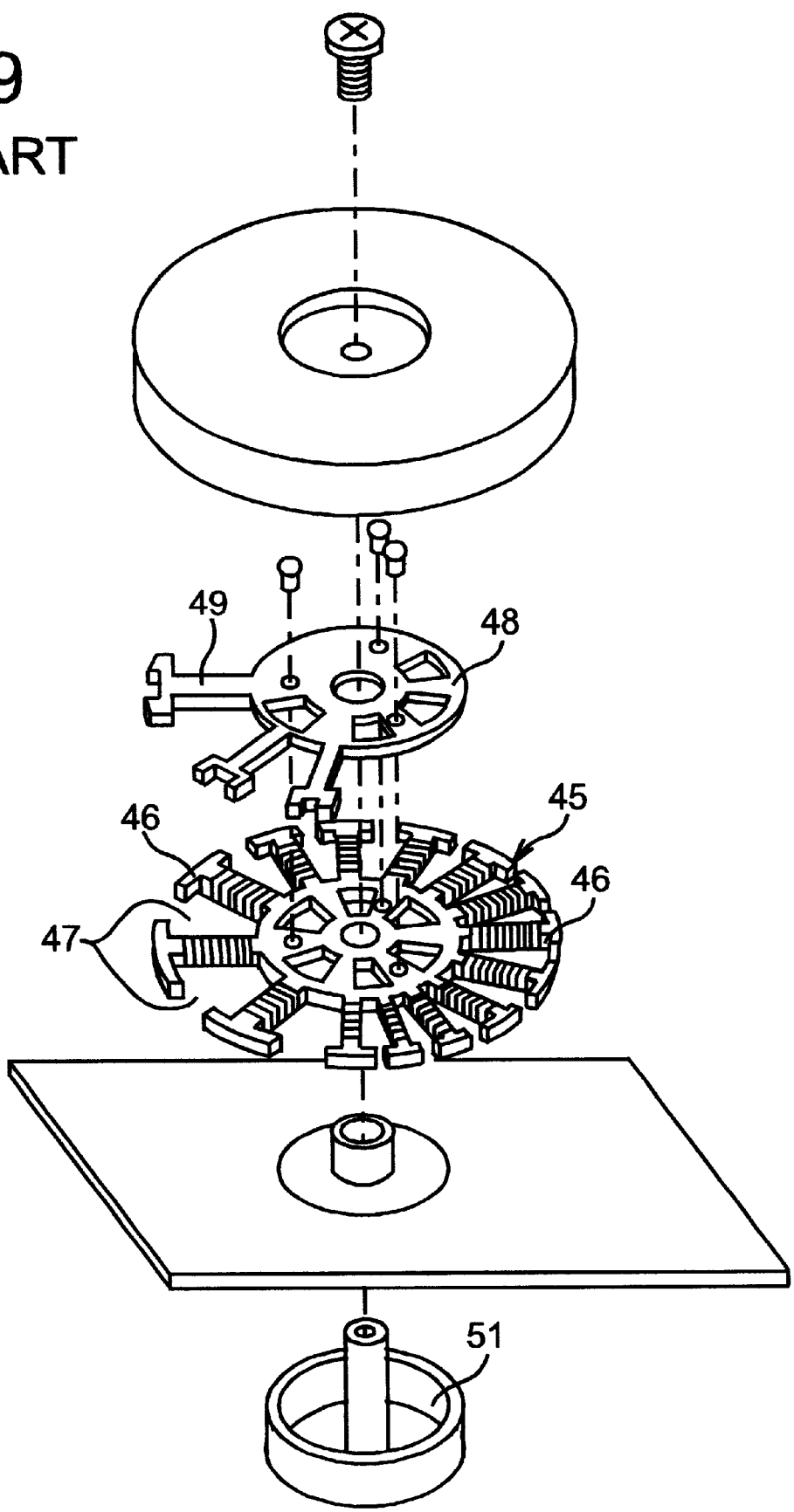
FIG. 9 is an exploded perspective view showing another conventional example.

Another conventional example is disclosed in JP A7-288963. FIG. 9 is an exploded perspective view. A stator core 45 has a plurality of salient poles 46 protruding radially. The stator core 45, however, has missing portions 47 obtained by removing part of the salient pole 46, and of course, the interval between the salient poles 46 in the missing portions 47 is larger than the interval between the remaining parts of the salient poles 46. An attractive plate 48 is located over the stator core 45, and salient poles 49 provided on the attractive plate 48 are placed so as to align with the missing portions 47 of the stator core 45.

Figure 10:
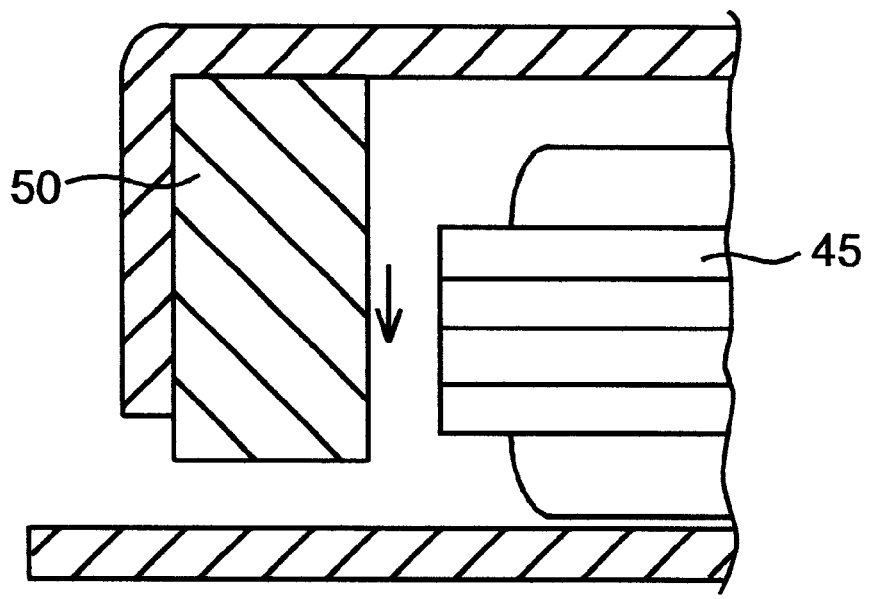
FIG. 10 is a sectional view showing an attractive force between a core and a driving magnet according to the prior art.

FIG. 10 is a sectional view showing the attractive force between the driving magnet 50 and portions of the core 45 that do not overlap the salient poles 49 of the attractive plate 48. The center of magnetism in each spindle direction is offset to subject the rotor to the force shown by the arrow.

Figure 11:
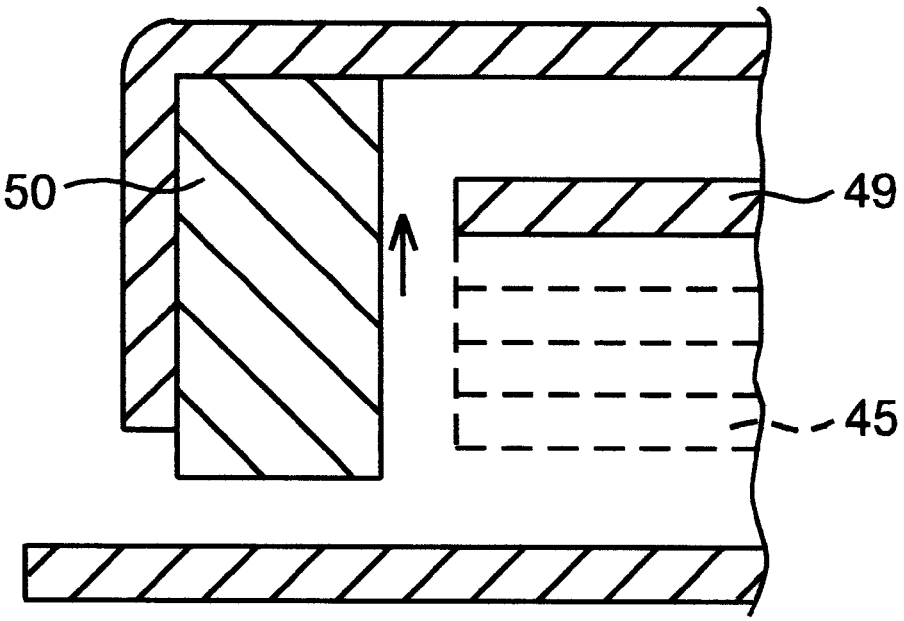
FIG. 11 is a sectional view showing an attractive force between an attractive plate and a driving magnet according to the prior art.

FIG. 11 is a sectional view showing the attractive force between the attractive plate 48 and the driving magnet 50 in the portions that overlap the salient poles 49 of the attractive plate 48. The rotor is attracted in the direction shown by the arrow in the figure. JP A7-288963 states that as a result, the attractive force acts in opposite directions between the portion of the core that overlaps the salient pole 49 of the attractive plate 48 and the portion that does not overlap it, thereby inclining the rotor to reduce the deflection of a rotating shaft 51.

In the spindle motor configured in this manner, the missing portions of the stator core 45 may reduce the torque generated by the motor. In addition, the presence of the attractive plate 48 limits the reduction of the thickness.

Embodiment 2 reduces shaft deflection while solving the above problem, that is, the hindrance of the reduction of the spindle motor thickness due to the structure for providing an inclination moment and the reduction of the speed-controlling frequency generating output or motor torque due to the same structure. Another object of this embodiment is to reduce the size and cost of the apparatus in order to provide an excellent spindle motor that accommodates the increased capacity of stored information, the increased information transmission speed, and the reduced size and thickness of the apparatus as well as an information recording apparatus comprising this spindle motor.

Embodiment 2 of this invention will be described with reference to the drawings.

Figure 12:
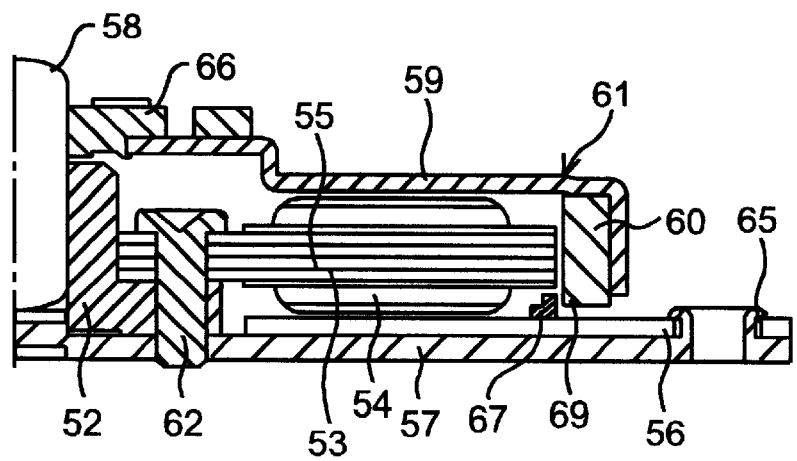
FIG. 12 is a half-sectional view of a spindle motor according to Embodiment 2.
Figure 13:
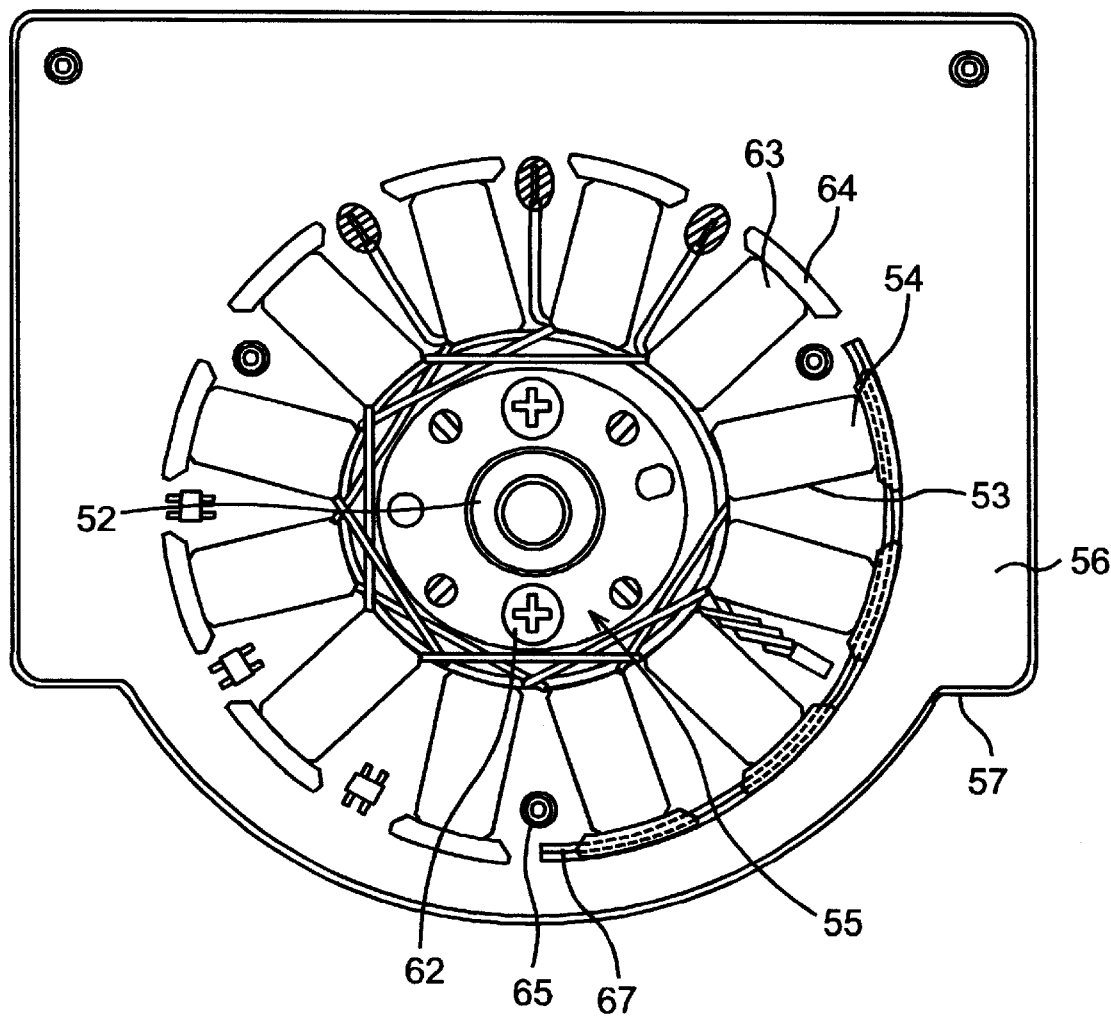
FIG. 13 is a plan view of a stator portion of the spindle motor according to Embodiment 2.

FIG. 12 is a half-sectional view of a spindle motor according to Embodiment 2. FIG. 13 is a plan view of a stator portion of this spindle motor. This spindle motor comprises a stator 55 having a bearing 52, a plurality of radial salient poles 53, and coils 54 wound around the salient poles 53; and a rotor 61 having a motor plate 57 including a stator substrate 56 that conducts electricity to the coils 54, a spindle 58 at the center of the rotor, and a driving magnet 60 on the inner surface of the outer circumferential portion of a rotor case 59 that is magnetized into multiple poles. The spindle 58 is rotatably journaled to the bearing 52.

At the center of the spindle motor, the bearing 52 is tightened and fixed to the motor plate 57 together with the stator 55, using screws 62. The stator 55 has a plurality of radial salient poles 53, each of which is composed of an arm portion 63 and a salient pole tip portion 64, with the coil 54 wound around the arm portion 63.

In addition, the stator substrate 56 is a printed substrate of a paper phenol. Burring portions 65 are provided on the motor plate 57 and are caulked to integrally stick and fix the stator substrate 56 to the motor plate 57. The coil 54 of the stator 55 is soldered to a predetermined conductive terminal (not shown) provided on the stator substrate 56 so as to electrically connect to an electric circuit on the stator substrate 56.

A rotor boss 66 is mounted at the center of the rotor 61, and the spindle 58 is press-fitted in the boss 66. The driving magnet 60 magnetized into multiple poles is stuck and fixed to the inside of the outer circumferential portion of the rotor case 59 of the rotor 61. The spindle 58 is rotatably journaled to the bearing 52, and the rotor 61 can be rotationally driven by conducting a current through the coils 54 via the stator substrate 56 to excite the stator 55.

The integral part of this invention is described below. A ferromagnetic body 67 is provided outside the coil 54 wound around the arm portion 63 of the stator 55, inside the stator outer diameter, and approximately under the salient pole tip portion 64 at the outer circumference of the stator. The ferromagnetic body 67 is formed by pressing a tinplate sheet and is fixed at this position by using a pressed and soldered tin plate to position it in the radial and circumferential directions.

As shown in FIG. 12, the ferromagnetic body 67 has its top opposed to the bottom of the inner circumferential surface of the driving magnet 60 and is opposed in proximity to one-third of the driving magnet 60 in the circumferential direction. The distance between the driving magnet 60 and the ferromagnetic body 67 is set slightly larger than or approximately equal to the distance between the driving magnet 60 and the salient pole tip 64 at the outer circumference of the stator. Of the magnetic fluxes from the driving magnet 60, major magnetic fluxes are directed to the salient pole tips 64, while only those fluxes from the bottom of the driving magnet 60 including its edge portion 69 are directed to the ferromagnetic body 67. Thus, the rotational-driving performance of the motor is not affected. In addition, the gap between the salient pole tip 64 and the ferromagnetic body 67 is set approximately equal to the gap between the driving magnet 60 and the salient pole tip 64 so that a magnetic flux from the driving magnet 60 toward a salient pole tip 64 does not flow to the adjacent salient pole tip 64 via the ferromagnetic body 67.

If such a ferromagnetic body 67 is not provided, the unbalance of the magnetic attractive forces acting between the driving magnet 60 and each of the salient pole tips 64 prevents the inclining direction of the spindle 58 from being constant. In addition, the weight unbalance of the rotor causes the falling-down direction to vary during the rotation of the motor. This appears as a whirling phenomenon of the spindle.

On the other hand, if there is the ferromagnetic body 67 as in Embodiment 2, the magnetic attractive force acting between the driving magnet 60 and the ferromagnetic body 67 attracts the spindle 58 toward the ferromagnetic body 67, thereby preventing the loosening between the spindle 58 and bearing 52 to reduce shaft deflection. As regards this, the reliability of binding is increased by using both soldering and adhesion in mounting the ferromagnetic body 67.

Figure 14:
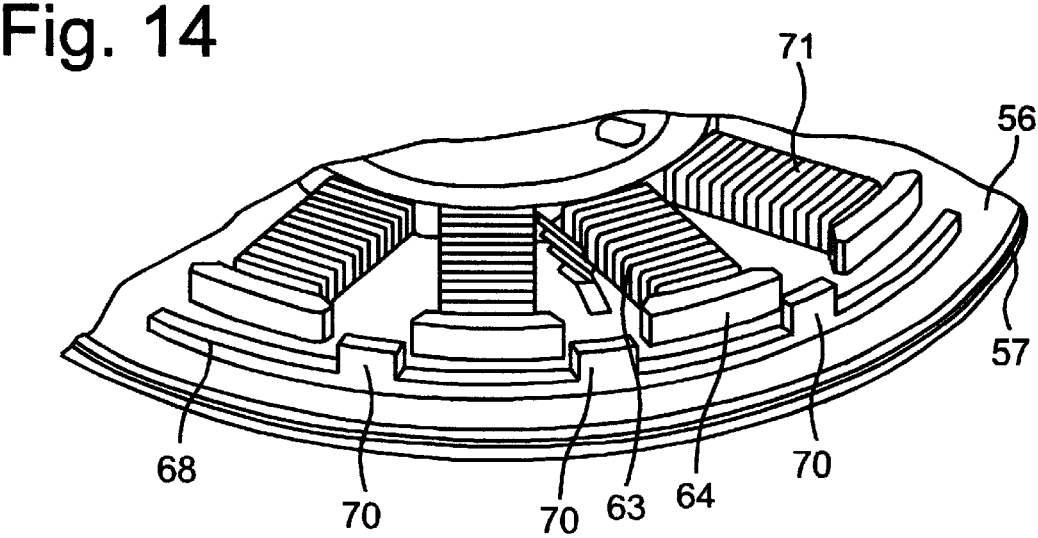
FIG. 14 is a perspective view of a stator portion according to Modified Example 1 of Embodiment 2.

FIG. 14 is a perspective view of a stator portion of a spindle motor according to Modified Example 1 obtained by modifying Embodiment 2. In this figure, projecting portions 70 are formed in a ferromagnetic body 68 and are each disposed between adjacent salient poles 71 of the stator (the portion between the salient poles is hereafter referred to as a "slot portion 72"). If the driving magnet (not shown) comprises an isotropic magnet, then in Embodiment 2, the attractive force required to attract the spindle toward the ferromagnetic body 68 may become insufficient. This modified embodiment provides the projecting portions 70 in the ferromagnetic body 68 to increase that area of the ferromagnetic body 68 which is opposed to the driving magnet in order to increase the attractive force. Since the number of projecting portions 70 is an integral multiple of the number of motor phases, so when the motor is rotationally driven, the effect of the projecting portion 70 equivalently appears in each phase to maintain the symmetry of driving in order to prevent torque ripples caused by the projecting portions 70 from being deteriorated.

This embodiment uses a three-phase motor and disposed the projecting portions 70 in the three slot portions 72.

In Embodiment 2 and Modified Example 1, the ferromagnetic body 68 is composed of a single part but may be composed of a plurality of parts, for example, a plurality of reflow-soldered parts such as chips.

Figure 15:
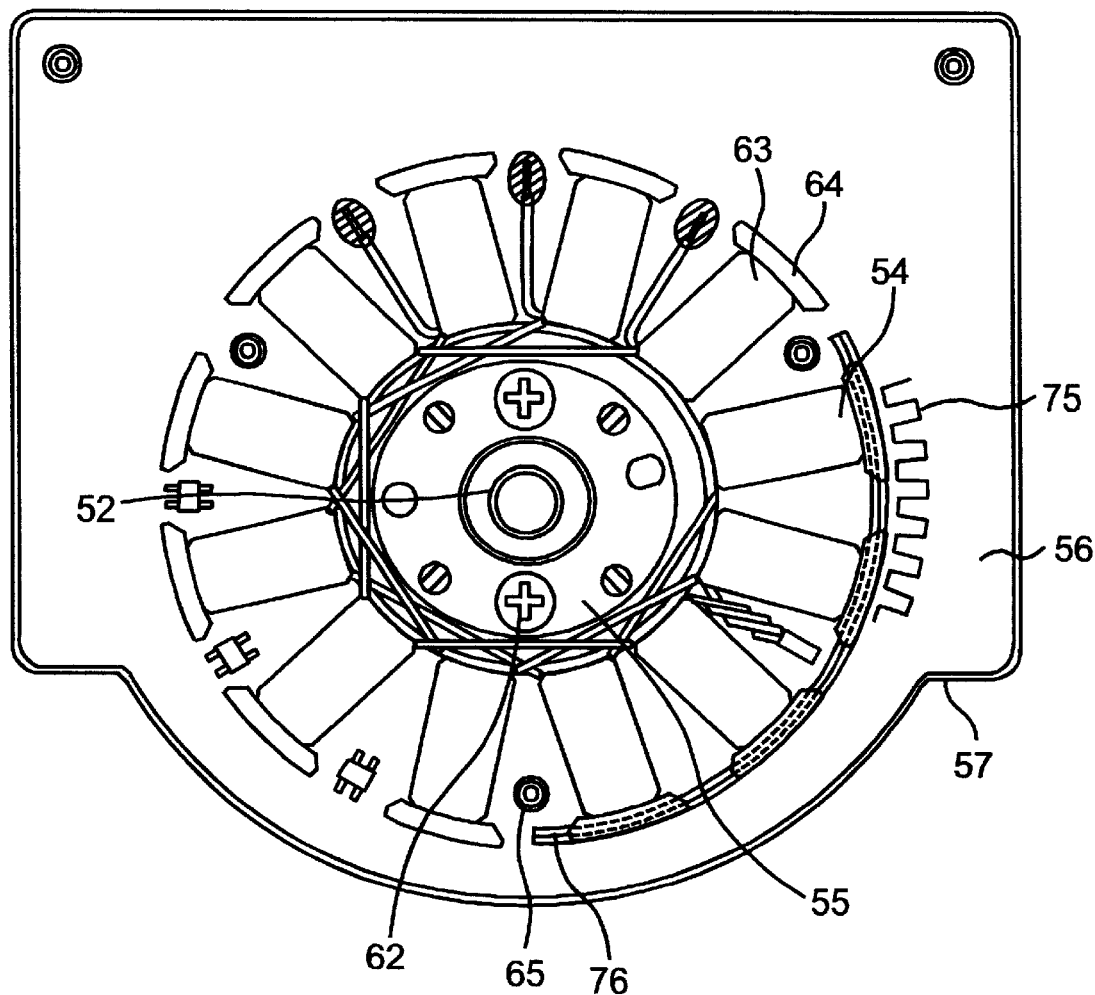
FIG. 15 is a plan view of the stator portion according to Modified Example 2 of Embodiment 2.

FIG. 15 shows a plan view of a stator portion of a spindle motor according to Modified Example 2 of Embodiment 2. In this figure, the stator substrate 74 is caulked and fixed to the motor plate 73 as in Embodiment 2. The end surface of a driving magnet (not shown) is magnetized into multiple poles for a frequency generator. A comb-shaped generating coil 75 for a frequency generator is provided on the stator substrate 74 and opposite to the end surface of the driving magnet by etching a copper foil on a printed circuit board. The rotor can be rotationally driven to obtain frequency generating signals proportional to the number of rotations. Modified Example 2 can provide a small, thin, and inexpensive spindle motor with a frequency generator that reduces shaft deflection, without the need to add special magnet parts for the frequency generator.

In addition, in both Embodiment 1 and its modified examples, the ferromagnetic body 67, 68, 76 is fixed to the stator substrate 56, 74 by means of soldering, but the assembly operation can be performed very easily, compared to the fixation of the ferromagnetic body 67, 68, 76 by means of screwing. In addition, for thin spindle motors, the protruding size of parts relative to the rear surface of the motor is sometimes strictly restricted to 0.05 mm or less. As regards this, this embodiment requires no considerations for the screw mounting method associated with screw tightening or the mounting strength, thereby enabling thin spindle motors with reduced shaft deflection to be stably manufactured during a manufacturing process.

In addition, since the ferromagnetic body 67, 68, 76 covers approximately one-eighth to half of the outer circumference of the stator 55, the force for attracting the shaft can be adjusted using the attractive force between the ferromagnetic body 67, 68, 76 and the driving magnet. In general, when the shaft is attracted to one direction, the shaft looseness decreases to reduce shaft deflection, whereas the lateral pressure on the bearing effected by the shaft increases bearing losses and thus the current value of the motor. In particular, in thin motors, the driving magnet often comprises a strong magnet of rare earth, but the force for attracting the spindle to one direction can be regulated by adjusting the circumferential length of the ferromagnetic body, thereby enabling selection of optimum conditions for shaft deflection and losses.

Figure 16:
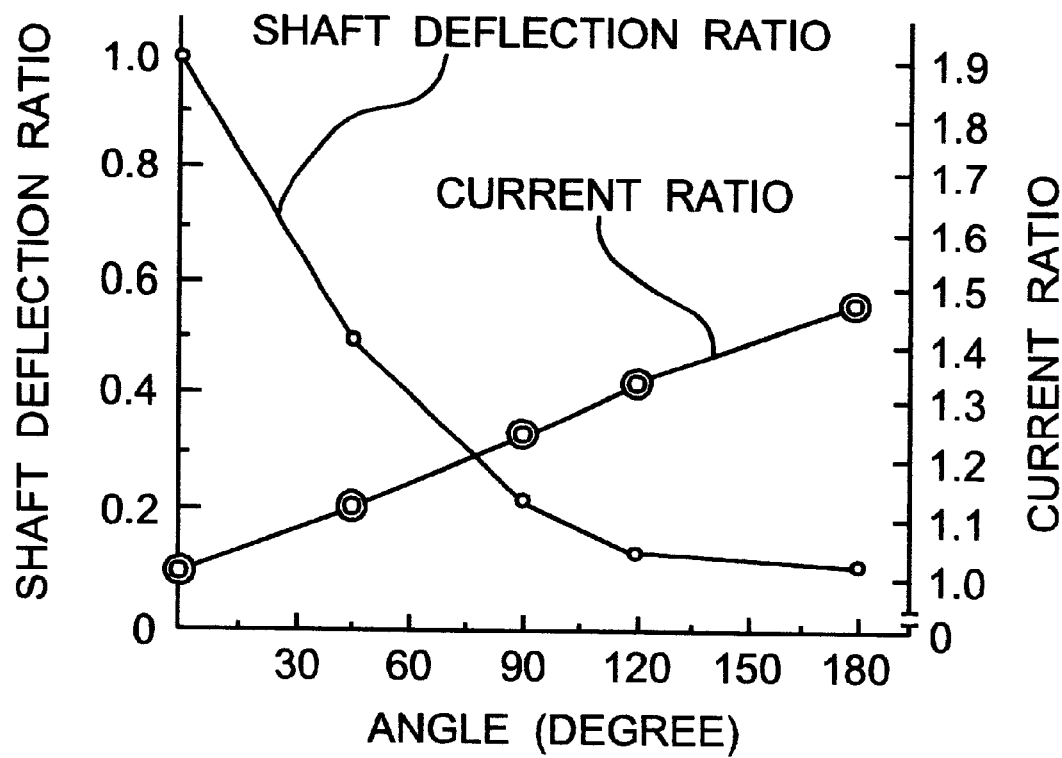
FIG. 16 is an explanatory drawing describing the circumferential angle of a ferromagnetic body vs. the shaft deflection ratio and the current ratio.

FIG. 16 shows the circumferential angle of the ferromagnetic body vs. the results of measurements of shaft deflection and current ratios. This data was obtained under the following conditions; the spindle motor includes a rotor of 50 mm outer diameter, the height of the ferromagnetic body 67, 68, 76 from the stator substrate 56, 74 is 0.9 mm, and the driving magnet 60 comprises an anisotropic rubber magnet. Relatively good data was obtained when the angle was between 45° and 180°.

Embodiment 3

Figure 17:
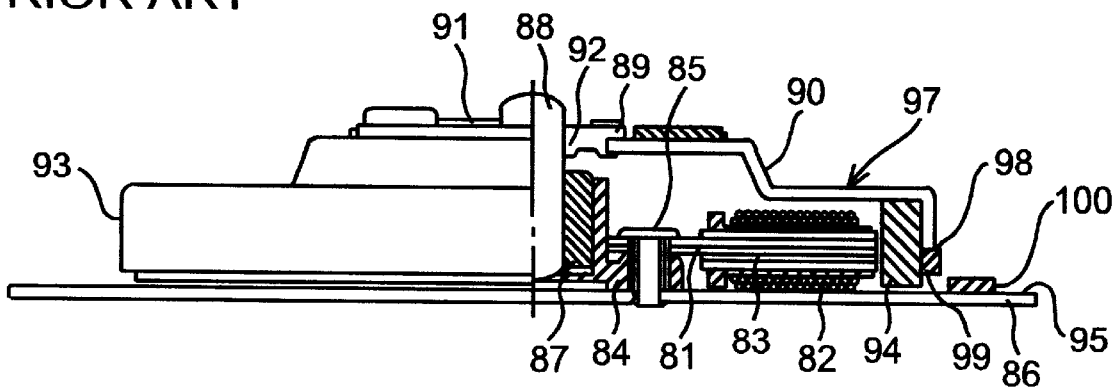
FIG. 17 is a half-sectional view of a conventional spindle motor.
Figure 18:
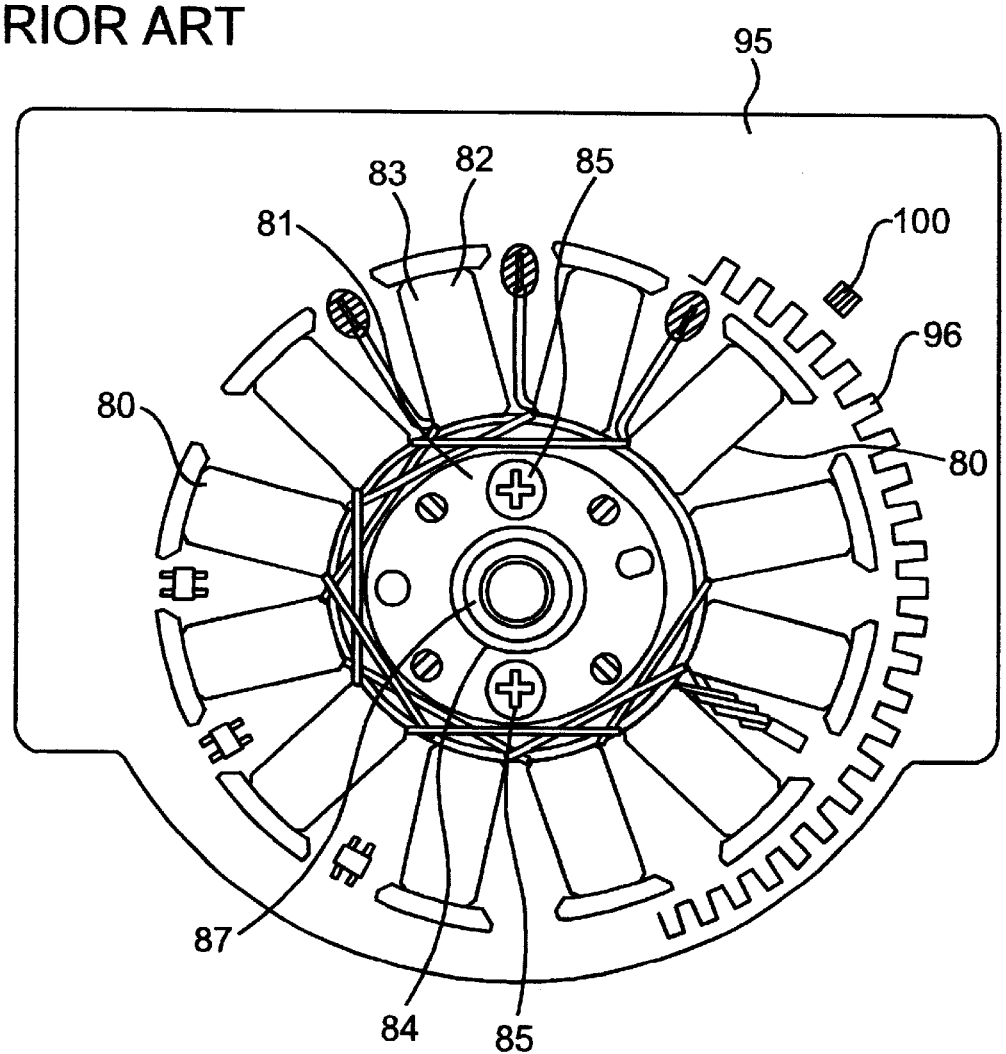
FIG. 18 is a plan view of the conventional spindle motor.
Figure 19:
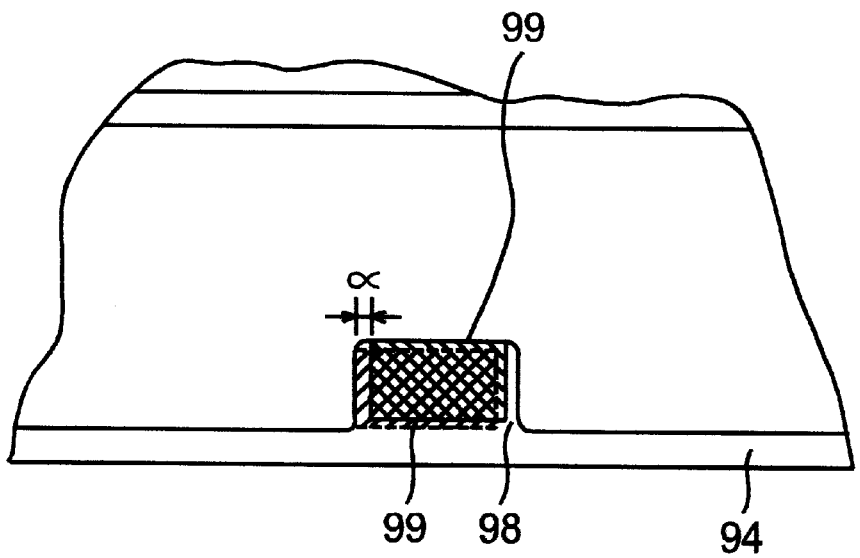
FIG. 19 is a detailed view of a conventional index magnet mounting portion.
Figure 20:
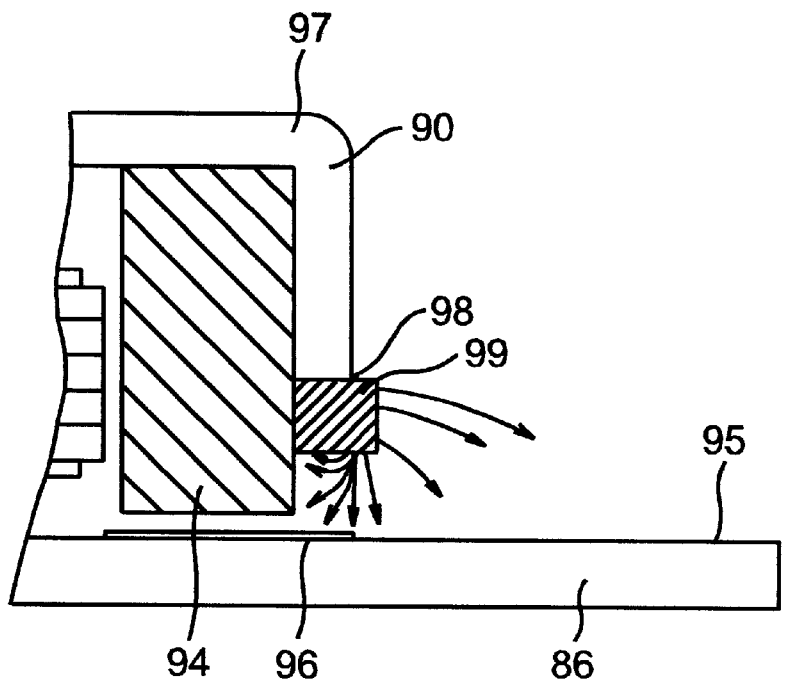
FIG. 20 is an explanatory drawing describing leakage fluxes from the conventional index magnet.

FIG. 17 shows a half-sectional view showing the structure of a prior-art spindle motor relating to this invention. FIG. 18 shows a plan view of a stator of this spindle motor. FIG. 19 shows a detailed view of an index magnet mounting portion of the rotor. FIG. 20 shows an explanatory drawing of leakage fluxes from the index magnet.

In the figures, a stator 83 comprising a stator core 81 having a plurality of salient poles 80 and around which coils 82 are wound is mounted at the center of a motor plate 86 together with a bearing housing 84, using screws 85. A sintered oil-containing metal 87 is inserted and mounted into the housing 84. In addition, a spindle 88 is inserted and mounted into the metal 87 in such a way as to be rotatably journaled thereto. A rotor boss 89 is press-fitted on the spindle 88. The rotor boss 89 is caulked and fixed to the center of a rotor case 90. Furthermore, a resin slide sheet 91 having a small friction coefficient is stuck to the top surface of the rotor boss 89 to constitute a hub receiving table 92 on which a disc (not shown) can be loaded.

In addition, a flange portion 93 is formed at the outer end of the rotor case 90, and a driving magnet 94 magnetized into multiple poles is formed on the inner circumferential surface of the flange portion 93 in such a way as to be opposed to the outer circumferential portion of the salient poles 80 of the stator 83.

Since the driving magnet 94 is magnetized in multiple poles, its bottom surface constitutes an FG magnetic pole (not shown), which is disposed opposite to an FG coil 96 having an FG magnetic pole provided by etching a copper foil on a stator substrate 95. When a rotor 97 is rotationally driven, an FG signal of a frequency proportional to the number of rotations is generated in the FG coil 96.

In addition a notch portion 98 is provided in the outer circumferential portion of the rotor case 90 as shown in FIG. 19, and a curvature (r) of about 0.2 is provided for two lower corners of the notch portion 98 for metal-mold manufacturing. An index magnet 99 of rare earth is mounted in the notch portion 98 using an adhesive. The index magnet 99 has a single magnetized pole on each of its front and rear surfaces, and cooperates with a position detection means 100, which is opposed in proximity to the index magnet 99 and composed of a coil, in generating one index signal in response to each rotation of the rotor 97.

The configuration described above is known as an index signal generating mechanism of conventional spindle motors for 3.5-inch floppy discs.

A problem of such a conventional configuration, however, is that the lower part of the index magnet 99 in the rotor case 90 is notched to cause leakage fluxes from the index magnet 99 to mingle with the FG coil 96 to generate an electromotive force during the rotation of the rotor 97, as shown by the arrows in FIG. 20. Consequently, the S/N ratio of FG signals is degraded to cause non-uniform rotations. Another problem is that the corners of the index magnet 99 and the curvature (r) of the notch portion 98 act as obstacles to displace the circumferential mounting position of the index magnet 99 by α, thereby preventing the correct rotating position of the rotor 97 from being detected, as shown in FIG. 19. Yet another problem is that the reduced thickness of the rotor case 90 reduces the adhesive holding area of the sides of the index magnet 99 to cause an adhesive to protrude to the outer circumferential portion or bottom surface of the rotor, resulting in the need of a wiping operation to degrade workability while increasing costs. In addition, since the amount of adhesive applied has been reduced to solve these problems, the adhesion strength has become insufficient to degrade quality.

An example of an attempt to solve these problems is described in JP Y7-47983. In this spindle motor, an index magnet mounting hole is tapered in the direction of the thickness of a rotor case, and an index magnet is also tapered and pressed into the rotor case. Thus, despite the avoidance of the use of an adhesive, JP Y7-47983 enables the index magnet to be mounted in the mounting hole so as not to be slipped out.

However, due to the reduced board thickness of the rotor case associated with the reduction of the spindle motor thickness, the tapering is difficult. In addition, JP Y7-47983 does not recognize the problems that the shape of the corners of the index magnet mounting hole causes the index magnet mounting position to vary in the circumferential direction to preclude the correct rotating position to be obtained and that the index magnet affects the S/N ratio of FG signals to deteriorate non-uniform rotations.

This embodiment implements an excellent spindle motor that improves the reliability of mounting while solving the above problems, that is, the proximity between an index magnet and an FG signal detection circuit associated with the reduced size and thickness and causing noise from the index magnet to rush into FG signals to deteriorate non-uniform rotations; the reduced board thickness of a rotor case degrading the workability in mounting the index magnet; and the degraded accuracy with which the index magnet is mounted. This embodiment also provides a disc driving apparatus using this spindle motor.

Embodiment 3 of this invention will be described with reference to the drawings.

Figure 21:
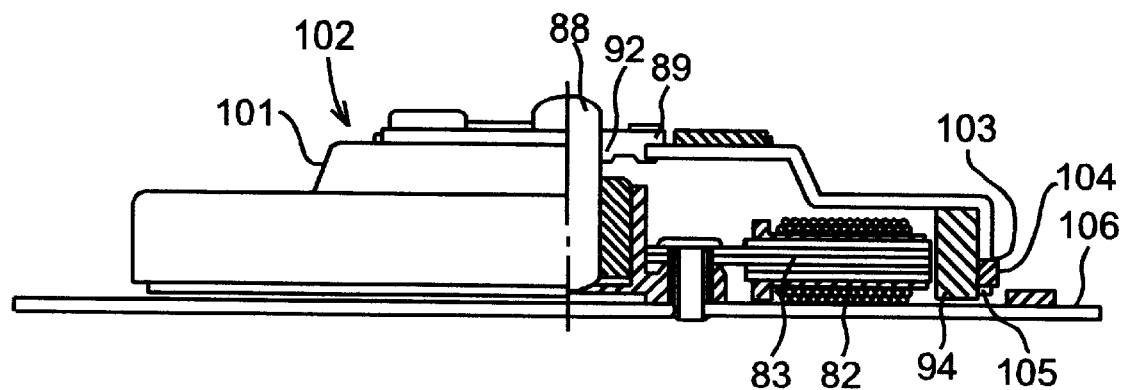
FIG. 21 is a half-sectional view of a spindle motor according to Embodiment 3.
Figure 22:
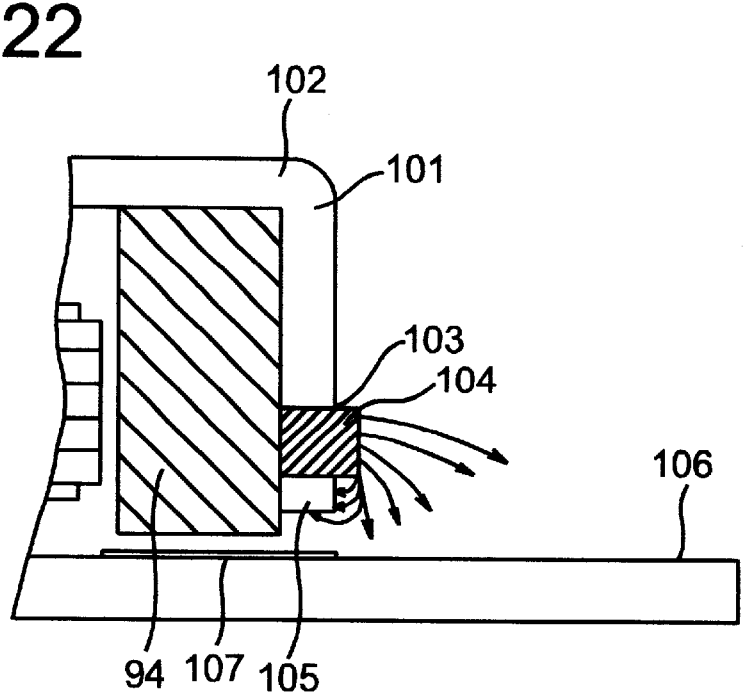
FIG. 22 is an explanatory drawing describing leakage fluxes from a rotor portion according to Embodiment 3.

FIG. 21 is a half-sectional view of a spindle motor according to Embodiment 3. FIG. 22 is an explanatory drawing of leakage fluxes from a rotor portion of this spindle motor.

According to Embodiment 3, a rotor case 101 has in its outer circumferential portion a square hole 103 having two sides parallel with the rotating direction of a rotor 102 and two sides perpendicular to the first sides. An approximately-rectangular-parallelopiped-shaped index magnet 104 is inserted and mounted in the square hole 103 and an ultraviolet-setting adhesive is used to bind the index magnet. Thus, since part 105 of the rotor case located under the square hole (the part close to the stator substrate) is not cut out as shown in FIG. 22, this part acts as a shield plate for the index magnet 104. That is, the bottom surface of the index magnet 104 is shielded and does not emit leakage fluxes. In addition, leakage fluxes from part of the index magnet 104 that protrudes from the outer circumference of the rotor case 101 are attracted to the part 105 under the square hole 103 in the rotor case 101 to reduce the radius of the rushing magnet fluxes and thus the number of magnet fluxes mingling with an FG coil 107 on a stator substrate 106, thereby improving the SIN ratio of FG signals to prevent the non-uniform rotation of the spindle motor.

Figure 23:
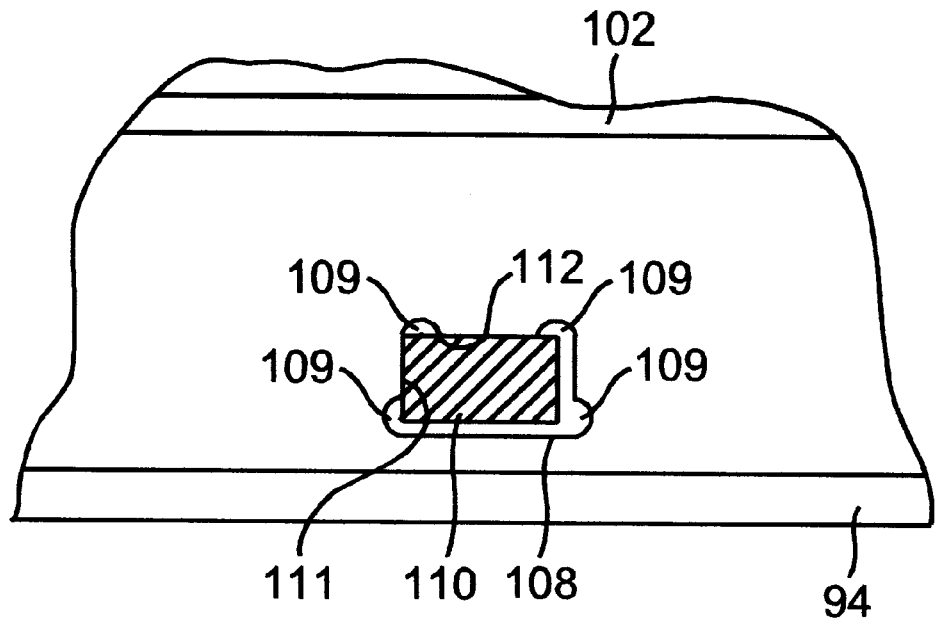
FIG. 23 is a partial side view of a rotor portion of a spindle motor according to Specific Example 1 of Embodiment 3.

FIG. 23 is a partial side view of a rotor of a spindle motor showing Specific Example of Embodiment 3. According to Specific Example 1, recesses 109 are provided in the corners of the square hole 108. Thus, the corners of the square hole 108 and the corners of an index magnet 110 do not interfere with one another. Consequently, the index magnet 110 is inserted and mounted in the square hole 108 so as to adhere to the hole by positioning the magnet using a left side 111 of the square hole 108 perpendicular to the rotating direction and a top side 112 parallel with the same direction, so the index magnet 110 can be inserted and mounted without inclination to reduce the circumferential misalignment of the index magnet 110, thereby enabling the correct rotating position of the rotor 102 to be detected to improve the position detection accuracy.

In addition, in Specific Example 1, the recesses 109 act as reservoirs for an adhesive. The index magnet 110 is stuck to the square hole 108 by applying a specified amount of adhesive to the square hole 108, inserting and mounting the index magnet 110 in the square hole 108, and shifting the index magnet 110 so that the two sides of the index magnet 110 adhere to the two corresponding sides of the square hole 108 as shown in FIG. 23. The adhesive correspondingly shifted is collected in the spaces in the recesses 109. The adhesive reservoirs 109 can provide spaces with the adhesive collected therein to preclude the unwanted extension of the adhesive, thereby eliminating the need to wipe the extended adhesive to realize an inexpensive spindle motor. In addition, adhesion is possible without the need to reduce the amount of adhesive, thereby improving the adhesion strength and thus the reliability of the spindle motor.

Figure 24:
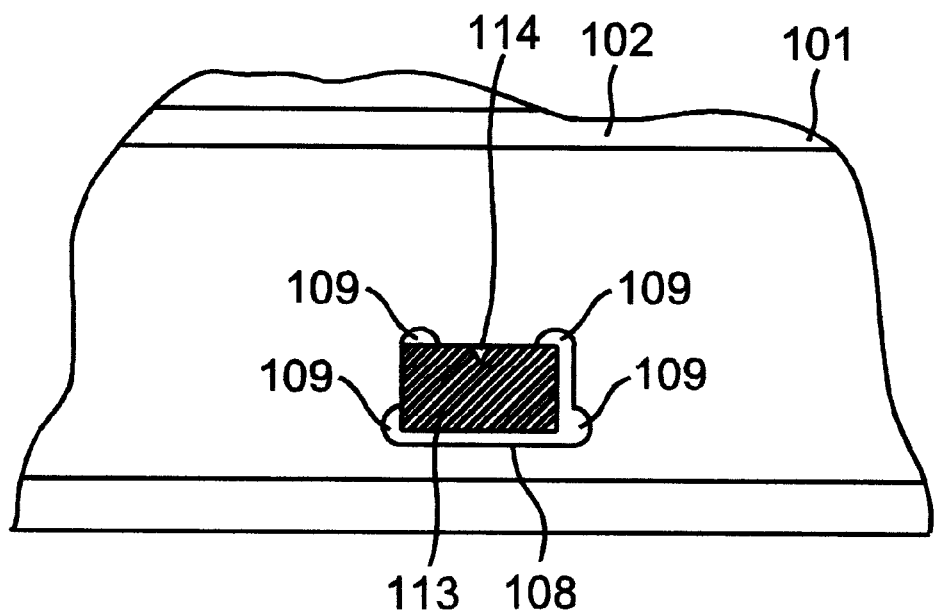
FIG. 24 is a partial side view of a rotor portion of a spindle motor according to Specific Example 2 of Embodiment 3.

FIG. 24 is a partial side view of a rotor showing Specific Example 2 of Embodiment 3. According to Specific Example 2, a V-shaped groove 114 is formed in a top side of an index magnet 113 and acting as an adhesive reservoir. Thus, adhesion is possible without the need to reduce the amount of adhesive, thereby improving the adhesion strength and thus the reliability of the adhesion.

Figure 25:
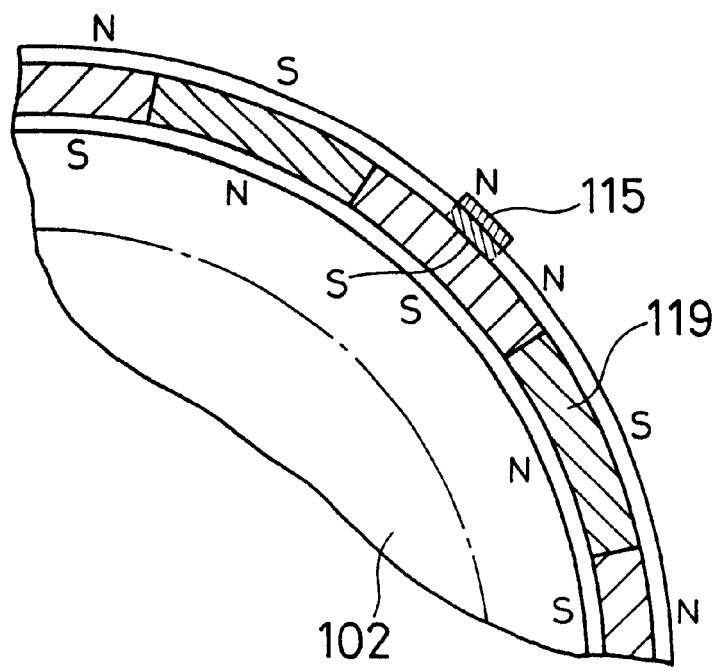
FIG. 25 is a partial plan view of a rotor according to Specific Example 3 of Embodiment 3 as seen from below.

FIG. 25 is a partial bottom view of a rotor of a spindle motor showing Specific Example 3 of Embodiment 3. The front and rear surfaces of an index magnet 115 have respective single magnetized poles having opposite polarities. A driving magnet 116 is incorporated in this example so that the magnetized polarity of the inner circumferential surface of the driving magnet 119 is opposed to the polarity of the surface of the index magnet 115. In this Example 3, the inner circumferential surface of the index magnet 115 has an S pole, while the outer circumferential surface of the driving magnet 119 has an N pole. Accordingly, due to their opposite polarities, the surface of the index magnet 115 and the outer circumferential surface of the driving magnet 116 attract each other to prevent the index magnet 115 from being displaced from its inserted and mounted position. Consequently, the index magnet 115 can be very easily stuck and fixed to a specified position to reduce the circumferential misalignment of the index magnet 115, thereby enabling the correct rotating position of the rotor 102 to be detected to improve the position detection accuracy.

Figure 26:
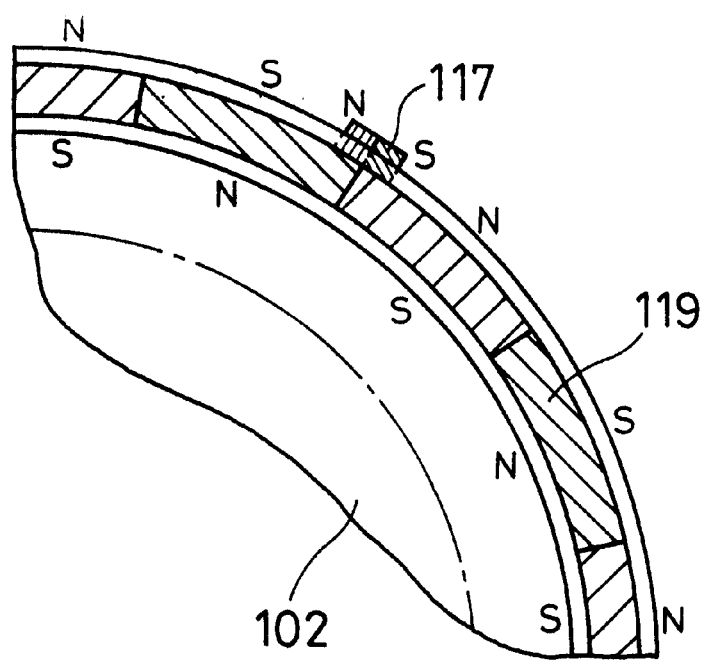
FIG. 26 is a partial plan view of a rotor according to Specific Example 4 of Embodiment 3 as seen from below.

FIG. 26 is a partial bottom view of a rotor of a spindle motor showing Specific Example 4 of Embodiment 3. The front and rear surfaces of an index magnet 117 each have two magnetized poles (the rotor 102 has two magnetized poles, that is, an N and S poles in the circumferential direction), and has the boundary of the magnetized poles at its center in the circumferential direction. The driving magnet 119 is incorporated in this example in such a way that the boundary of the magnetized poles of the driving magnet 119 is located approximately at the center of a square hole, so the magnetized boundary of the index magnet 117 aligns with the magnetized boundary of the driving magnet 119. Since the index magnet 117 is inserted and mounted so that the magnetized polarity of the outer circumferential surface of the driving magnet 119 is opposed to the polarity of the rear surface of the index magnet 117, they attract each other to preclude the index magnet 117 from being displaced from its inserted and mounted position. Consequently, the index magnet 117 can be very easily stuck and fixed to a specified position to reduce its circumferential misalignment, thereby enabling the correct rotating position of the rotor 102 to be detected to improve the position detection accuracy.

As described above, this invention prevents the degradation of the S/N ratio of FG signals caused by the index magnet in order to provide an excellent spindle motor with few non-uniform rotations that prevents the circumferential misalignment of the index magnet while improving the reliability associated with the sticking of the index magnet.

Embodiment 4

Figure 27:
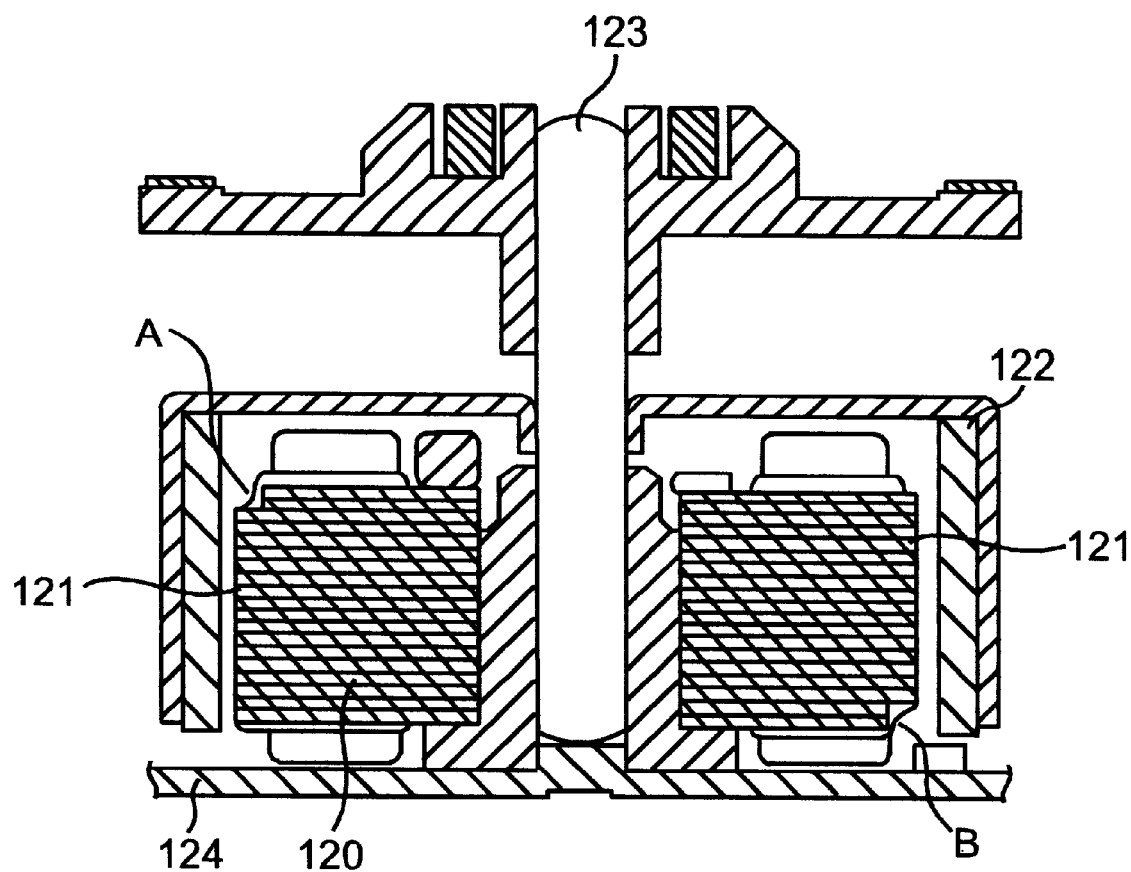
FIG. 27 is a sectional view of a conventional spindle motor.

FIG. 27 is a sectional view of a spindle motor showing the conventional technique disclosed in JP A9-74705.

On one side of the head mechanism moving direction (the lateral direction in the drawing), the tip portion A of salient poles 121 of a stator core 120 located on the upward side of their lamination direction is cut out, while on the other side, their tip portion B on the downward side of the lamination direction is cut out. The attractive force between such unbalanced salient poles 121 and a driving magnet 122 can incline a spindle 123 to the left in FIG. 27 to reduce the shaft clearance on the head mechanism moving direction side, thereby eliminating the surface deflection in the moving direction of a disc head mechanism to improve the disc read and write capabilities. In addition, by inclining a motor plate 124 through a predetermined angle relative to a motor mounting member, the spindle 123 can be located approximately perpendicularly to an end surface of the motor mounting member while a disc loaded on a turn table can be located approximately parallel with this end surface.

However, in the basic concept that the spindle 123 is located perpendicularly to an end surface of the motor mounting member while a disc loaded on a turn table is located parallel with this end surface, the above conventional technique does not fully recognize the positional relationship between the inclining direction of the spindle and the mounting member. As a result, this technique cannot easily realize the concept that the spindle is located perpendicularly to an end surface of the motor mounting member while a disc loaded on a turn table is located parallel with this end surface, thereby failing to fully utilize the shaft deflection reduction effect for a disc driving apparatus.

An object of Embodiment 4 is to solve these conventional problems in order to provide an excellent spindle motor that clearly defines the inclining direction of a spindle and the position relations of a mounting portion so that the spindle can be located perpendicularly to an end surface of a motor mounting member while a disc loaded on a turn table can be located parallel with this end surface, in order to reduce shaft deflection to restrain the whirling of a disc loading surface. Embodiment 4 also provides a disc driving apparatus that uses this spindle motor to reduce disc track deflection in order to improve the disc read and write capabilities.

Embodiment 4 of this invention will be described below with reference to the drawings.

A head is configured to move parallel with a spindle motor mounting surface of a motor mounting member. For explanation, the following description assumes that the spindle motor mounting surface lies in the horizontal direction.

Figure 28:
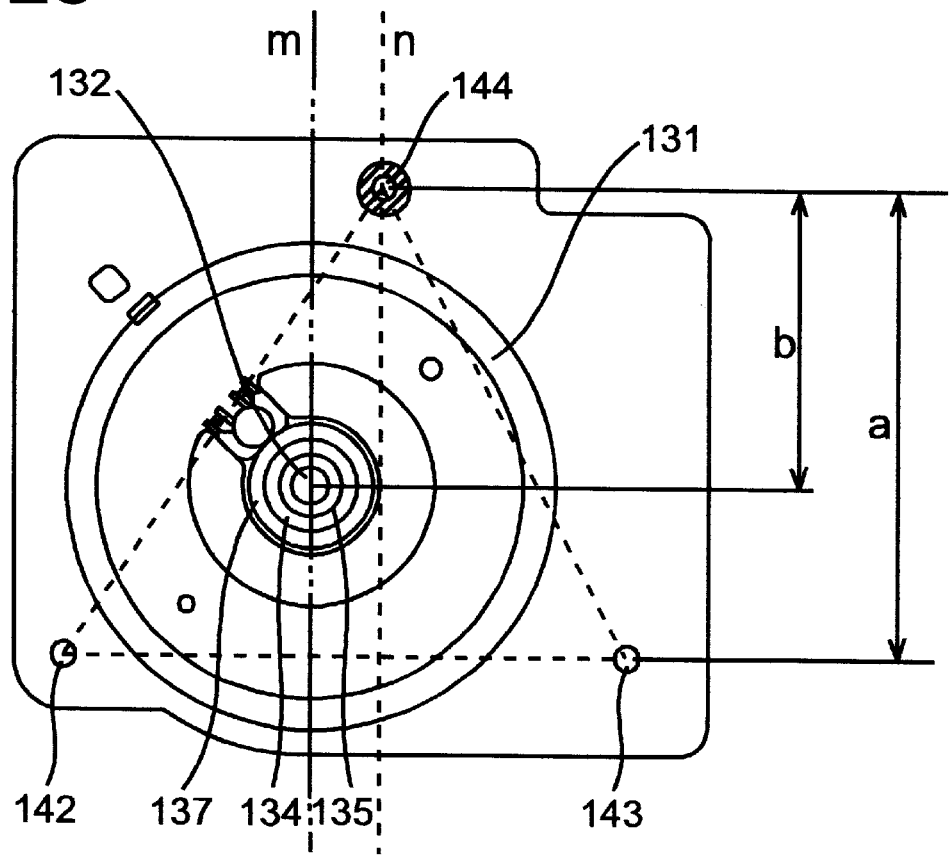
FIG. 28 is a plan view of a spindle motor according to Embodiment 4 of this invention.
Figure 29:
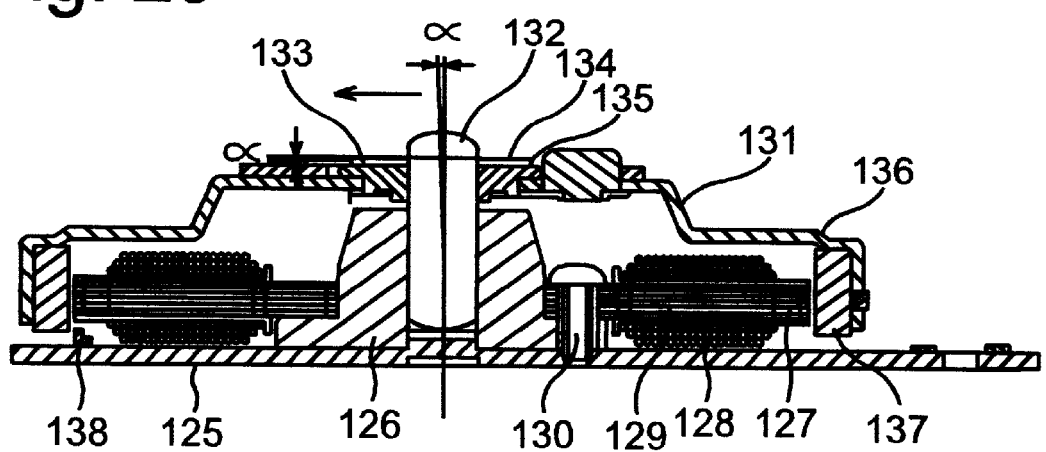
FIG. 29 is a sectional view of the spindle motor according to Embodiment 4.
Figure 30:
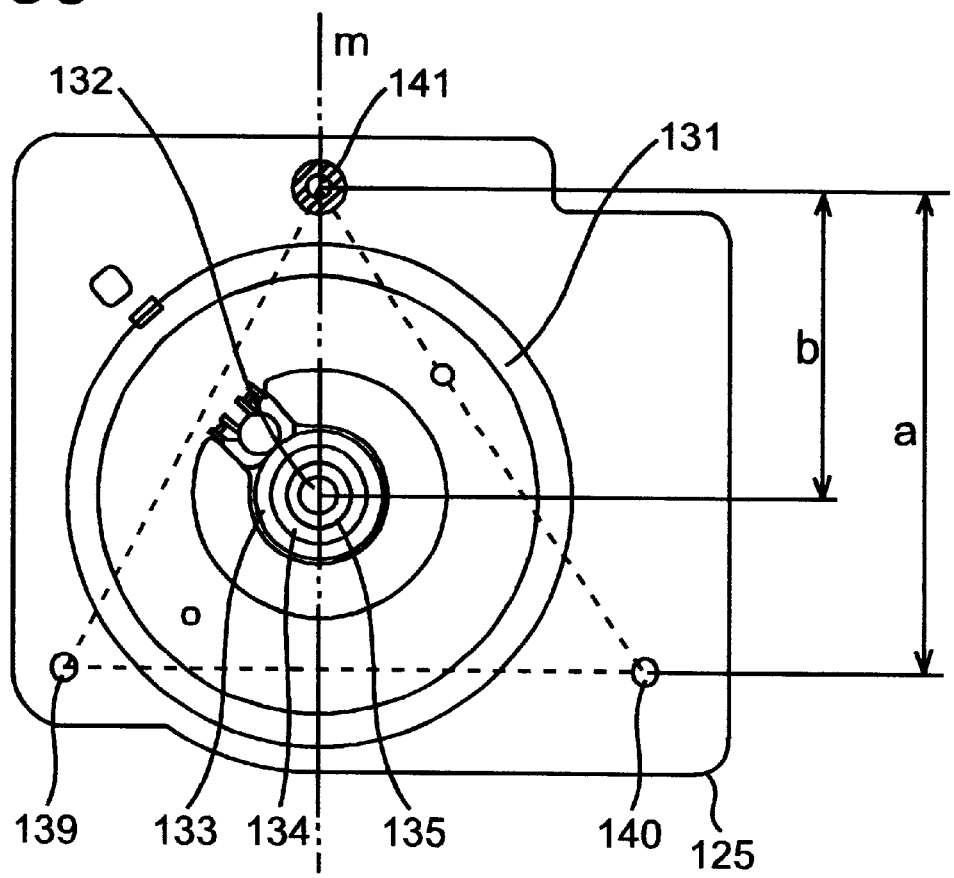
FIG. 30 is a plan view describing Embodiment 4.
Figure 31:
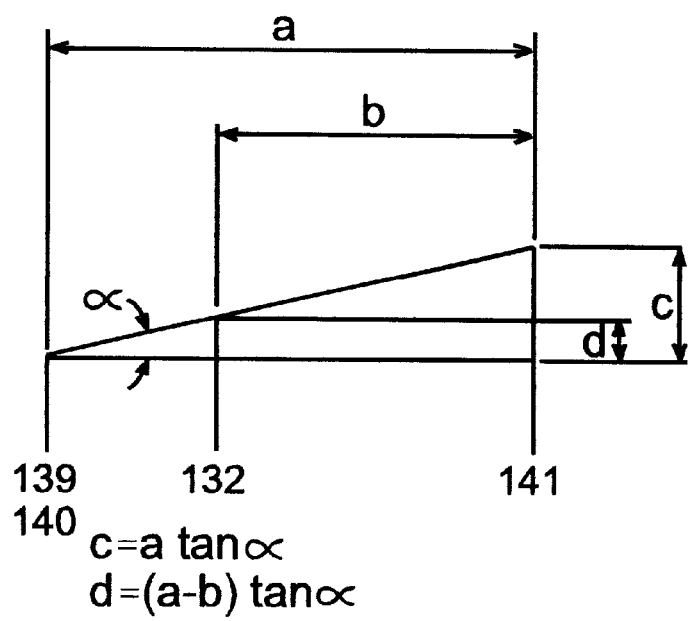
FIG. 31 is an explanatory drawing describing the inclination of a disc loading surface according to Embodiment 4.

FIG. 28 is a plan view of a spindle motor according to Embodiment 4. FIG. 29 is a sectional view of this spindle motor. FIG. 30 is a plan view for describing the spindle motor. FIG. 31 is an explanatory drawing describing the inclination of a disc loading surface. In FIGS. 29 and 30, a metal bearing 126 and a stator core 129 comprising a plurality of salient poles 127 around which coils 128 are wound are tightened and fixed to a motor plate 125 using screws 130. On the other hand, a hub 133 with a spindle 132 press-fitted therein and fixed thereto is caulked and fixed to the center of a rotor 131. A slide sheet 134 is stuck to the top surface of the hub 133 to constitute a disc loading surface. That is, the top surface of the slide sheet 134 acts as a disc loading surface 135. The spindle 132 is orthogonally press-fitted in the disc loading surface 135 and is rotatably journaled approximately perpendicularly to a motor plate 125 using a metal bearing 126. An annular driving magnet 137 with its inner circumferential side magnetized into multiple poles is press-fitted and fixed to the inside of the outer circumferential portion of a rotor case 136 of a rotor 131, and is opposed to salient poles 127 of the stator core 129.

A ferromagnetic body 138 is formed by pessing a plated steel plate, and is positioned and solered to be fixed in the radial and circumferential directions, at a position outside the coils 128 wound around the stator core 129, inside the outer circumference of the stator core 129, and approximately under the tip of the salient poles 127 at the outer circumference of the stator core 129. The ferromagnetic body 138 is opposed in proximity to part of the inner circumferential surface of the driving magnet 137 and part of its circumferential direction, and acts as an inclining means for inclining the spindle 132 toward the ferromagnetic body 138 (the inclination is exaggerated in FIG. 29) based on a magnetic attractive force acting on the ferromagnetic body 138.

In FIG. 30, mounting portions 139, 140, 141 fixedly attached to a motor mounting member of a disc driving apparatus (not shown) are provided as three holes in the motor plate 125. A line (m) passing through the center of the spindle in such a way as to orthogonally cross a line joining the mounting portions 139 and 140 together is defined as the inclining direction of the spindle, and the hole of the mounting portion 141 is provided on the line (m).

The mounting of the spindle configured in this manner is stabilized by defining a plane thereof by the three mounting portions. In addition, the spindle 132 exists inside a triangle consisting of the three mounting portions 139, 140, 141, thereby restraining the vibration of the disc loading surface caused by the motor. This configuration improves the reliability of writes and reads executed by the head in the disc driving apparatus. In addition, the spindle 132 is inclined through an angle corresponding to the inner-diameter fitting clearance between the spindle 132 and the metal bearing 126. That is, the spindle 132 is inclined through an angle α, as shown in FIG. 29. Then, the clearance between the spindle 132 and the bearing in the inclining direction is eliminated to reduce the deflection of the spindle in order to restrain whirling.

In this case, the disc loading surface 135 orthogonal with the spindle 132 is inclined from a horizontal surface through the angle α. In FIG. 30, the disc loading surface 135 is assumed to be initially inclined in such a way that its mounting position 141 side lies higher than the opposite side. Corrections for the inclination is described with reference to FIGS. 30 and 31. When the distance between the line joining the mounting portions 139 and 140 together and the mounting portion 141 is defined as (a), the disc loading surface can be corrected so as to be parallel with the motor mounting member by lowering only the mounting portion 141 from the initial position by c=a tan α.

In addition, if the distance between the mounting portion 141 and the spindle 132 is defined as (b), the height of the disc loading surface is corrected to decrease by d=(a–b) tanα. By changing the height of only the mounting portion 141, the disc loading surface can be parallelized relative to the motor mounting member. In addition, the corrected height of the disc loading surface can be very easily calculated to enable very easy design of a spindle motor that is subjected to reduced deflection and that rotationally drives the disc on a surface parallel with the motor mounting member to reduce the deflection of disc tracks.

FIG. 28 shows a case where due to, for example, the arrangement of electronics in a driving circuit (not shown) provided in the motor plate 125, the mounting portion 141 in FIG. 30 cannot be provided on the line (m) passing through the center of the spindle in such a way as to orthogonally cross a line joining the mounting portions 142 and 143 together. In FIG. 28, a mounting portion 144 is provided on a line (n) parallel with the line (m).

Since the mounting portions 141, 144 have an identical height, the plane formed of the mounting portions 139, 140, 141 is identical to the plane formed of the mounting portions 142, 143, 144, the mounting portion 144 provided on the line (n) parallel with the line (m) has the same functions as the mounting portion 141 in FIG. 30. Thus, as in the description using FIGS. 30 and 31, the disc loading surface can be parallelized relative to the motor mounting member by changing the height of only the mounting portion 144. In addition, the corrected height of the disc loading surface can be very easily calculated to enable very easy design of a spindle motor that is subjected to reduced deflection and that rotationally drives a disc on a surface parallel with the motor mounting member to reduce the deflection of disc tracks.

According to Embodiment 4, the following values are determined from the bearing clearance.

$\alpha = 0.07°$ (a)=45 (mm), (b)=35 (mm)

The mounting portion height correction size (c) and the change in the height of the disc loading surface (d) are determined as follows.

(c)=a tan α=0.055 (mm)

(d)=(a–b) tan α=0.012 (mm)

Thus, in this embodiment, the initial height of the mounting portion 144 may be reduced by 0.055 mm.

Figure 32:
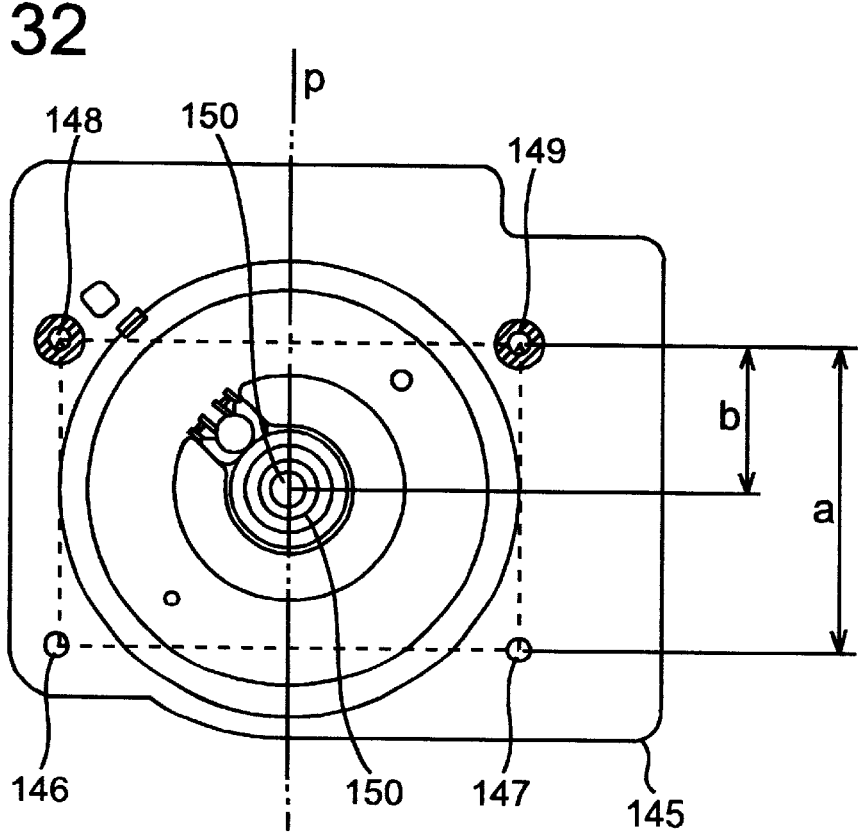
FIG. 32 is a plan view of a spindle motor according to Modified Example 1 of Embodiment 4.

Next, Modified Example 1 of Embodiment 4 is described. FIG. 32 is a plan view of Modified Example 1 of Embodiment 4 of this invention. A motor plate 145 has four mounting portions 146, 147, 148, 149 that are attached to a motor mounting member.

The four mounting portions 146, 147, 148, 149 are provided on two lines orthogonal with an inclining direction line P of a spindle 150 and are arranged so that the spindle 150 exists inside a rectangle consisting of the four mounting portions.

According to this configuration, no mounting portion or obstruct exists on the line P corresponding to the inclining direction of the spindle 150 and passing through the center of the spindle. Accordingly, a head and a head moving mechanism can be disposed in proximity to a rotor of a motor to enable design of a small head moving mechanism. In addition, since the spindle 150 exists inside the rectangle consisting of the four mounting portions, the vibration of the disc loading surface caused by the motor is restrained to improve the reliability of writes and reads executed by the head. In addition, the line P is orthogonal with the line joining the mounting portions 146 and 147 together and with the line joining the mounting portions 148 and 149 together. Thus, when the interval between the lines joining the two sets of mounting portions together is defined as (a) and the distance between the spindle and the line joining the mounting portions 148 and 149 together is defined as (b), a disc loading surface 150 can be parallelized relative to the motor mounting member by using the same calculations as in Embodiment 4 to change the height of the two mounting portions. In addition, the corrected height of the disc loading surface 150 can be very easily calculated to enable easy design of a spindle motor that is subjected to reduced deflection of spindle and that rotationally drives a disc on a surface parallel with the motor mounting member to reduce the deflection of disc tracks.

Figure 33:
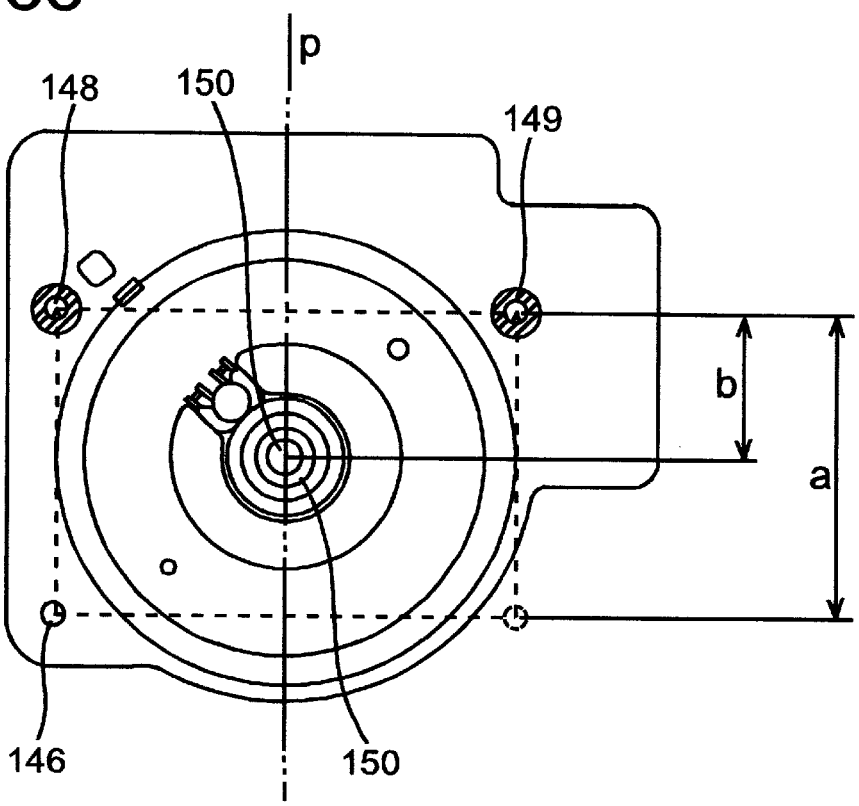
FIG. 33 is a plan view of a spindle motor according to Modified Example 2 of Embodiment 4.

FIG. 33 is a plan view of a spindle motor according to Modified Example 2 of Embodiment 4 of this invention. Modified Example 2 shows a different case of FIG. 32 for Modified Example 1 where the configuration of a motor plate prevents, for example, the mounting portion 147 from being provided. If a motor causes little vibration and its mounting stability has no problem, then one mounting portion may be omitted to provide only three as shown in FIG. 33.

Figure 34:
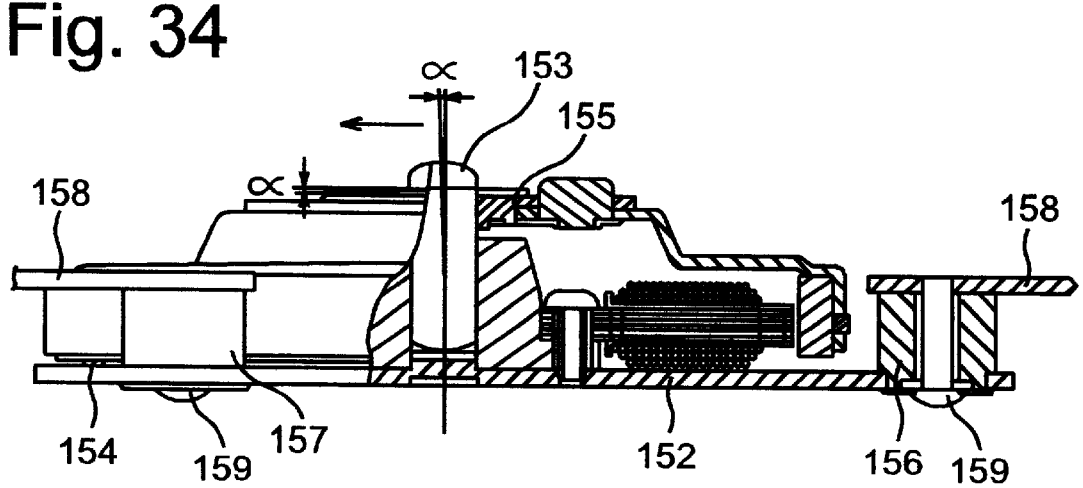
FIG. 34 is a sectional view of a spindle motor according to Modified Example 3 of Embodiment 4.

Next, Modified Example 3 of Embodiment 4 is explained with reference to FIG. 34. This figure is a partial sectional view of a spindle motor showing Modified Example 3 of this embodiment. A spindle 153 is inclined by a spindle inclining means 154 through an angle α relative to a motor plate 152 in the direction shown by the arrow in the figure. A disc loading surface 155 is also inclined through the angle α from a horizontal surface in such a way that its rotor height correction means 156 side lies higher than the opposite side. Height correction means 156, 157 formed by machining brass are caulked and fixed to spindle motor mounting portions. The height correction means 156 is configured to be higher than the height correction means 157 by the value described in Embodiment 4 or Modified Example 1, and can be mounted on a motor mounting member 158 using screws 159 in order to make the disc loading surface 155 parallel with the motor mounting member 158.

Despite the presence of three or four height correction means as described in Embodiment 4 or Modified Example 1, the two height correction means of two types of sizes 156, 157 can be used to mount the disc loading surface parallel with the motor mounting member 158. Thus, this configuration requires fewer types of height correction means, is easy to manage and inexpensive, and reduces the deflection of disc tracks to enable production of a spindle motor with a &head having high write and read capabilities.

In addition, the height correction means 156, 157 may be provided on the motor plate 152 by means of pressing or may be configured by sticking separate spacers to motor plate. Alternatively, the motor plate may comprise a printed circuit board, and the height correction means may comprise the thickness of a copper foil or a resin print such as a solder resist cover print.

Figure 35:
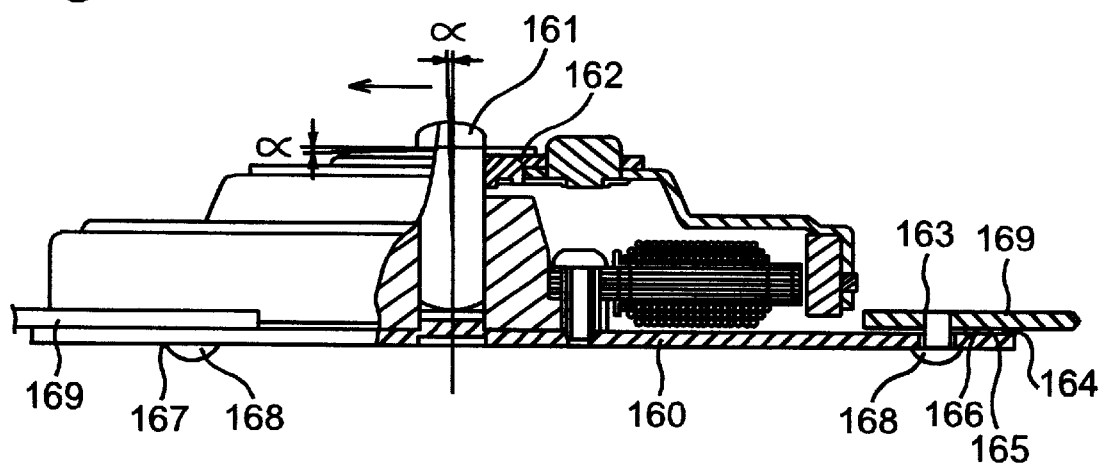
FIG. 35 is a sectional view of a spindle motor according to Modified Example 4 of Embodiment 4.

Next, Modified Example 4 of Embodiment 4 of this invention is explained with reference to FIG. 35. This figure is a sectional view of a spindle motor representing Modified Example 4. A motor plate 160 is a metal-base printed circuit board on which a motor drive control circuit (not shown) comprising electronics is mounted. A spindle 161 is inclined by a spindle inclining means (not shown) through an angle α relative to the motor plate 160 in the direction shown by the arrow in the figure. A disc loading surface 162 is inclined through the angle α from a horizontal surface in such a way that its rotor mounting portion 163 side lies higher than the opposite side.

The mounting portion 163 is a hole around which a copper foil 164, a solder resist 165, and a cover print 166 are laminated. The copper foil, solder resist, and cover print are not laminated on the mounting portion 167 side. The intervals (a), (b) for the mounting portions are identical to those in Embodiment 4 or Modified Example 1. Accordingly, by distributing the difference in mounting portion height as shown below, the total difference in height becomes 0.055 (mm), and the disc loading surface 162 can be mounted parallel with the motor mounting member 169 by using screws 168 for fixation.

Thickness of the copper foil: 0.035 (mm)
Thickness of the solder resist: 0.01 (mm)
Thickness of the cover print: 0.01 (mm)

By providing the difference in height during a printed circuit board etching process utilizing the thickness of the copper foil 164 and the thickness of the resin print such as the solder resist 165 or the cover print 166 in the above manner, the disc loading surface 162 can be mounted parallel with the motor mounting portion 169 of the disc driving apparatus.

Embodiment 5

Figure 36:
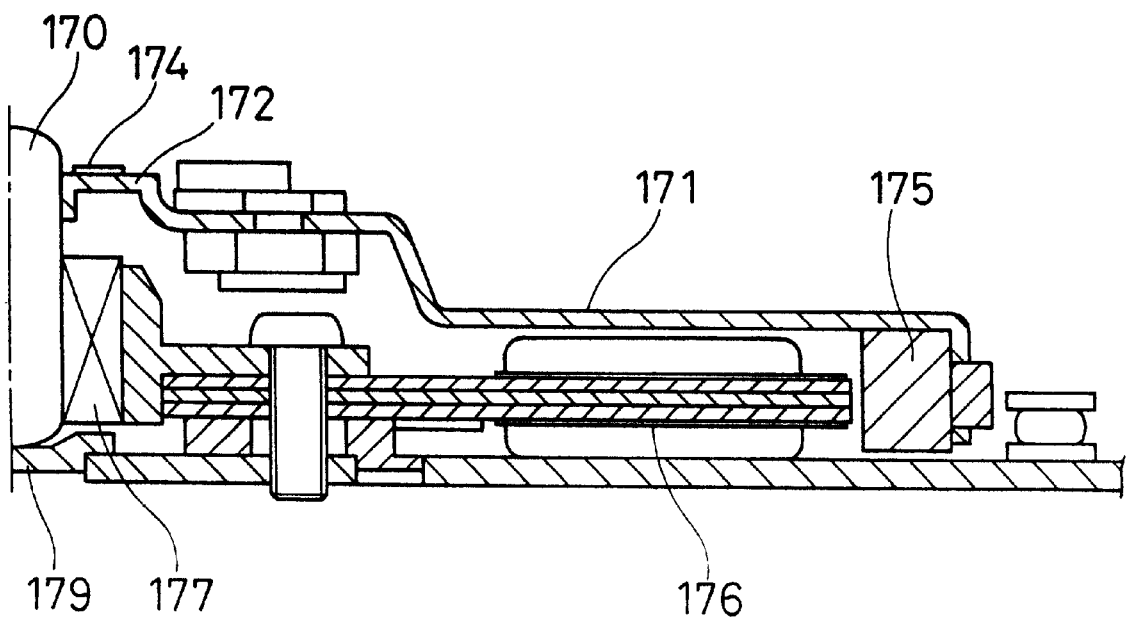
FIG. 36 is a sectional view of a conventional spindle motor.

FIG. 36 is a sectional view of a spindle motor showing the conventional technique disclosed in JP Y6-84560.

According to this conventional technique, a cup-shaped rotor case 171 is mounted at the upper end of a spindle 170. A projecting portion 172 is provided at the center of the rotor case 171, and a through-hole is formed at the center of the projecting portion 172. The upper end of the spindle 170 is press-fitted in and fixed to a burring portion 173 protruding downward at the outer circumference of the through-hole in such a way as to form a cylinder.

A Teflon sheet is stuck to the top surface of the projecting portion 172 as a coating 174, which is used as a hub table and the top surface of which constitutes a disc loading surface. Inside the outer circumferential wall of the rotor case 171, a driving magnet 175 is opposed to salient poles of a stator core 176 at an interval. The spindle 170 is inserted into a bearing 177 so as to abut its lower end on a thrust bearing 179 so that the spindle 170 is rotationally driven.

This configuration requires no hub table as a separate member, thereby enabling manufacturing costs to be reduced. In addition, since the rotor case 171 is directly mounted on the spindle 170, this configuration can prevent the degradation of the accuracy resulting from the deflection of the spindle 170 caused by a driving magnet. In addition, this configuration does not require parts to be accumulated on one another, so it can accommodate the further reduction of the thickness.

Such a conventional configuration, however, must improve the accuracy with which parts such as the spindle and the burring portion are machined, in order to accomplish the object to reduce the deflection of the disc loading portion that is associated with the increased capacity and speed of the disc driving apparatus and the reduced thickness thereof Besides, to reduce the distortion of the burring portion after press-fitting, the press-fitting interferences of the spindle and burring portion must be reduced. However, there is a trade-off relationship between the improvement of surface deflection and the binding strength obtained by the interference, and the reduced interference may reduce the binding strength. In addition, to accommodate the further reduction of the spindle motor thickness, the axial length of the burring portion must be reduced, and this reduction may further reduce the binding strength of the spindle.

Thus, a problem of this conventional configuration is that simply press-fitting the burring portion in the spindle cannot realize the binding between the spindle and the rotor case that improves the deflection of the disc loading portion to deal with the increased capacity and speed and the reduced thickness and that accommodates the further reduction of the thickness.

An object of Embodiment 5 is to solve these conventional problems in order to provide an excellent spindle motor that allows a spindle to be easily and inexpensively bind-fixed perpendicularly to a rotor case while maintaining very reliable binding and that reduces the surface deflection of a disc loading surface to accommodate the increased capacity and speed and the reduced thickness. Another object of this embodiment is to provide a disc driving apparatus that uses this spindle motor to reduce the surface deflection of a disc in order to improve disc read and write capabilities.

Embodiment 5 of this invention will be described below with reference to the drawings.

Figure 37:
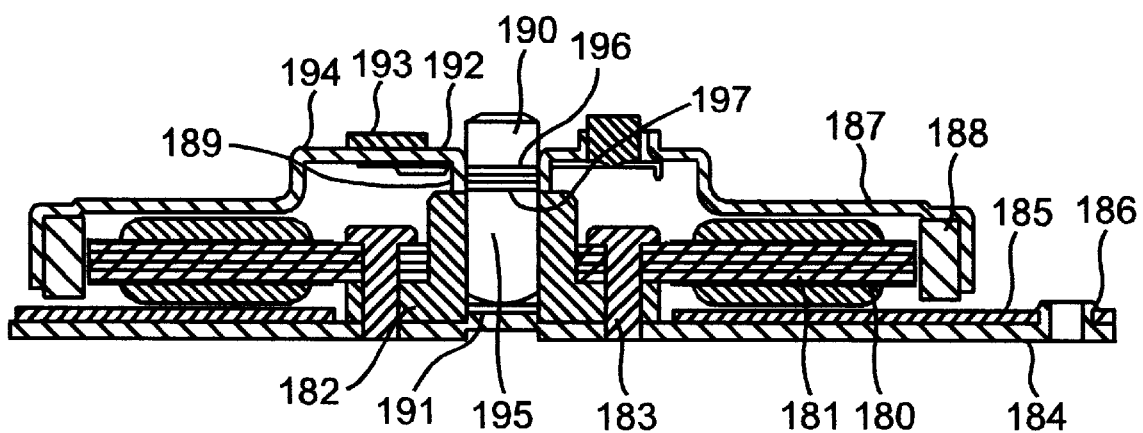
FIG. 37 is a sectional view of a spindle motor according to Embodiment 5 of this invention.
Figure 38:
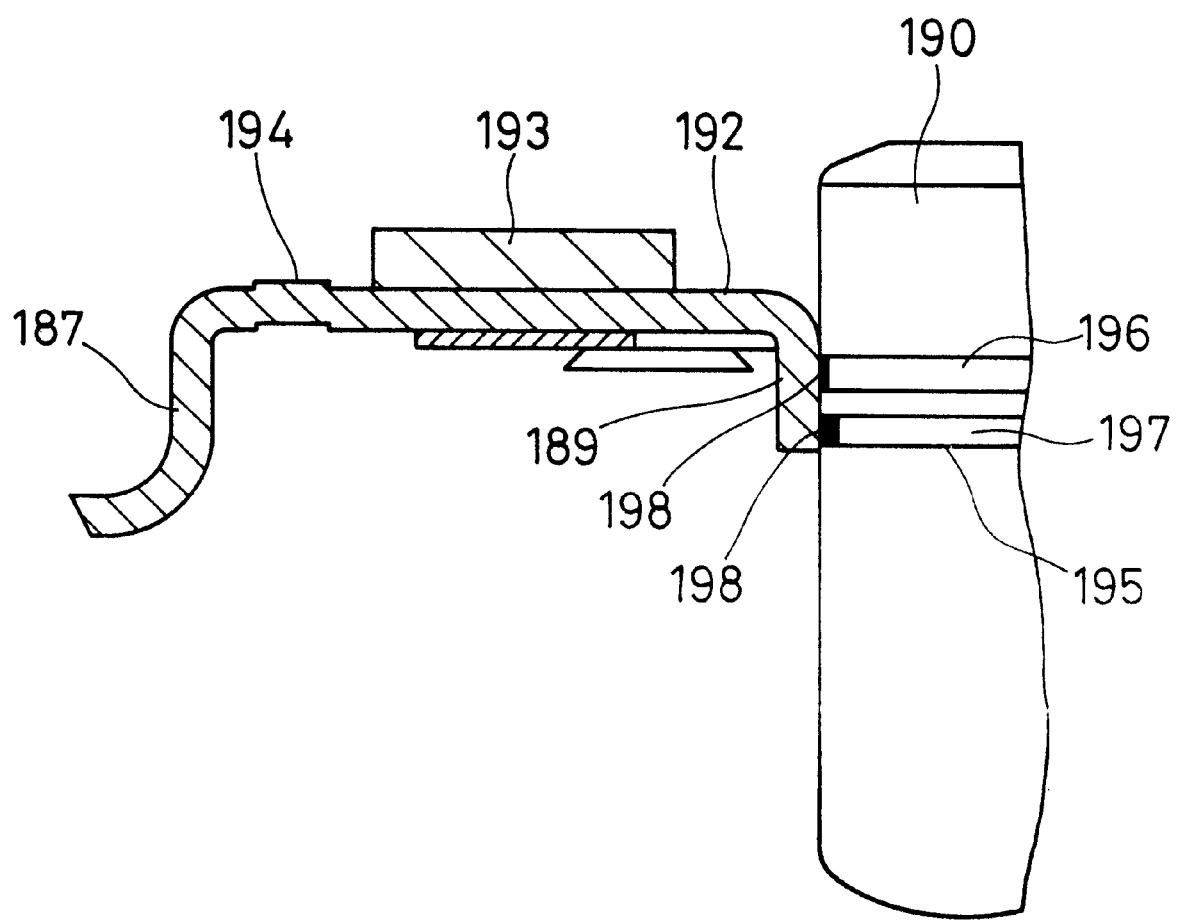
FIG. 38 is an enlarged explanatory drawing of a rotor case binding portion according to Embodiment 5 of this invention.

FIG. 37 shows a sectional view of a spindle motor according to Embodiment 5. FIG. 38 is an enlarged explanatory drawing of a binding portion between a spindle and a rotor case.

A stator core 181 having coils 180 wound around a plurality of salient poles is mounted on a motor plate 184 together with a bearing housing 182, using screws 183. A stator substrate 185 is caulked and fixed by a substrate stop 186 provided on the motor plate 184 by means of burring, and a circuit for conducting electricity to the coils 180 (not shown) and a motor drive control circuit (not shown) are mounted on the substrate 185.

A driving magnet 188 magnetized into multiple poles is bind-fixed to the inside of the outer circumferential wall of the rotor case 187. An inner circumferential cylindrical portion 189 is provided at the center of the rotor case 187 by burring the rotor case 187 so as to protrude downward, and a spindle 190 is fixed to the cylindrical portion 189. The spindle 190 is rotatably journaled by a bearing housing 182 and a thrust plate 191. A projecting portion 192 is provided on the top surface of the center of the rotor case, and a hub magnet 193 that magnetically attracts a disc is stuck and fixed to the projecting portion 192 using a pressure sensitive adhesive double-coated tape. An annulus-ring-shaped disc loading portion 194 formed as a step slightly higher than the projecting portion 192 (see FIG. 38) is provided at the outer circumference of the hub magnet 193 so as to constitute a disc hub (not shown) abutting surface.

Two circumferential grooves 196, 197 are provided in the outer circumferential surface 195 of the spindle 190. In FIG. 38, an adhesive 198 having an anaerobic and ultraviolet-setting properties is applied to the groove 196, and the rotor case 187 is pressed in downward from the upper part of FIG. 38, so that the circumferential grooves 196, 197 are opposed to the inner circumferential cylindrical portion 189. The circumferential groove 196 is an adhesion groove for obtaining an adhesion strength and has an optimum depth depending on the viscosity of an adhesive. The circumferential groove 197 is a housing groove housing an amount of adhesive that cannot be accommodated in the circumferential groove 196 and having a larger depth than the circumferential groove 196. An adhesive applied to the circumferential groove 196 is moved due to strokes provided by the inner circumferential portion of the inner circumferential cylindrical portion 189, so that most of the adhesive is held in the circumferential groove 197. The remaining part of the adhesive sticking to the inner circumferential edge portion is held in the space between a shear droop at the corner of the circumferential edge portion and the spindle 190. Alternatively, the circumferential groove 197 may be wider than the circumferential groove 196.

According to this configuration, the binding strength of the spindle is obtained as the sum of the binding strength resulting from the press-fitting interference and the adhesion strength provided by the adhesive. Consequently, the press-fitting interference can be reduced compared to the prior art to reduce the distortion of the inner circumferential cylindrical portion 189 caused by press-fitting, thereby providing a spindle motor that reduces the inclination of the spindle and the deflection of the disc loading portion.

In addition, despite the decrease of binding strength resulting from the reduced axial length of the inner circumferential cylindrical portion 189, the binding strength is increased by adhesion to accommodate the further reduction of the spindle motor thickness. Besides, the circumferential groove 197 houses an extra adhesive to prevent it from flowing to below the lower end of the inner circumferential cylindrical portion 189. As a result, this configuration precludes an adhesive, which may obstruct the sliding between the spindle 190 and the bearing housing 182, from entering the bearing, thereby providing a spindle motor that allows the spindle to be reliably bind-fixed.

Figure 39:
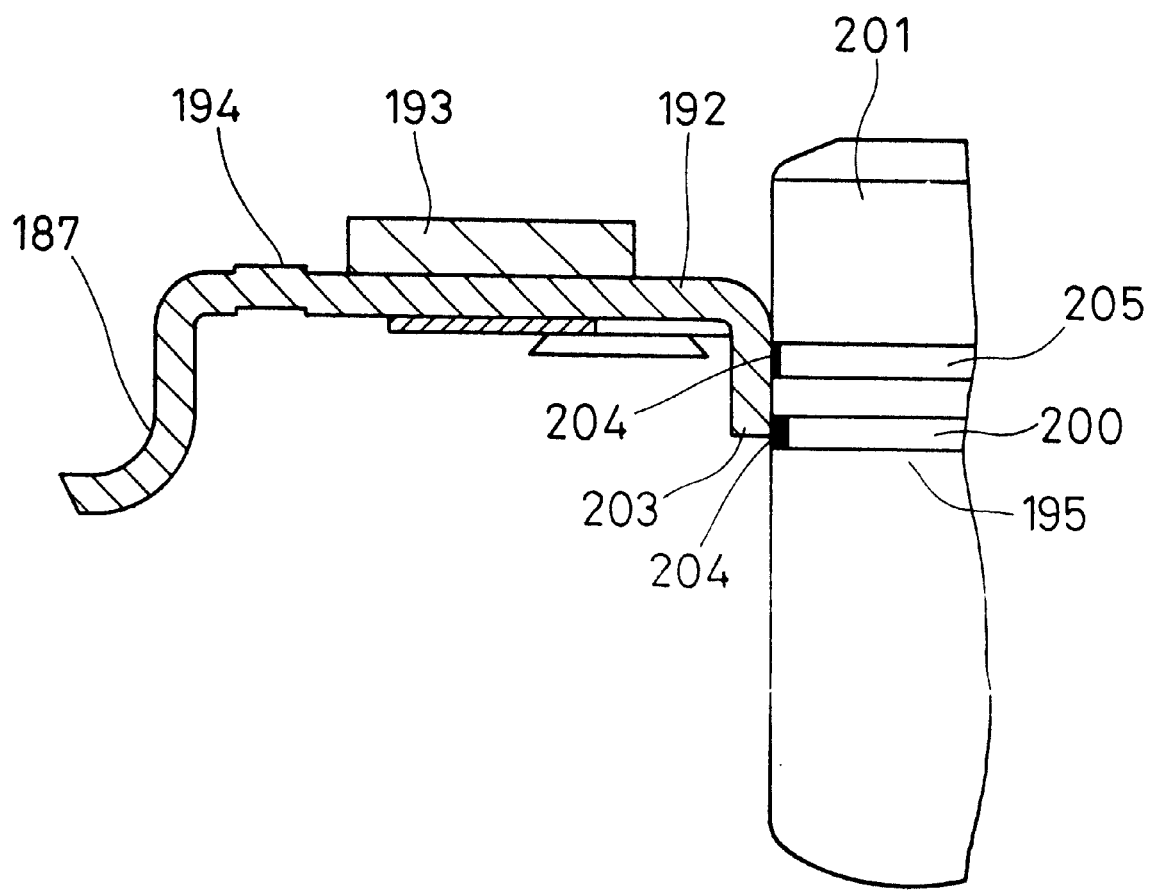
FIG. 39 is an enlarged explanatory drawing of a rotor case binding portion according to Modified Example 1 of Embodiment 5.

FIG. 39 shows an enlarged explanatory drawing of a binding portion between a spindle and a rotor case showing Modified Example 1 of Embodiment 5. In this figure, a circumferential groove 200 is provided in a spindle 201 slightly below the circumferential groove 197 described in Embodiment 5. That is, the circumferential groove 200 is provided at a position at which after the press-fitting of a rotor case 187 on the spindle 201, at least part of the circumferential groove 200 in the axial direction is exposed from the lower edge of an inner circumferential cylindrical portion 203.

Thus, an adhesive 204 is stroked by the lower edge upon press-fitting and is then moved while sticking to this edge. Then, due to its surface tension, the adhesive 204 is held in a space formed by the lower edge and the circumferential groove 200. By passing the spindle motor through a conveyor-type ultraviolet-ray irradiating adhesive setting furnace in such a way that the lower edge of the inner circumferential cylindrical portion 203 of the rotor case 202 faces upward, the adhesive 204 held in this space can be completely hardened easily so as not to flow out toward the bearing. Consequently, an adhesive or a hardened adhesive can be prevented from entering the sliding portion between the spindle 201 and the bearing housing.

In a small spindle motor of a small spindle diameter, when an extra adhesive resulting from a variable amount of adhesive applied to the circumferential groove 205 is held in the circumferential groove 200, this groove provides a much higher adhesive holding effect than the circumferential groove 197 according to Embodiment 5.

In addition, by coloring the adhesive loud red or blue, the condition of the adhesive held in the circumferential groove 200 can be visually inspected to check whether the correct adhesion operation has been performed, thereby providing a spindle motor that allows the spindle to be reliably bind-fixed.

Figure 40:
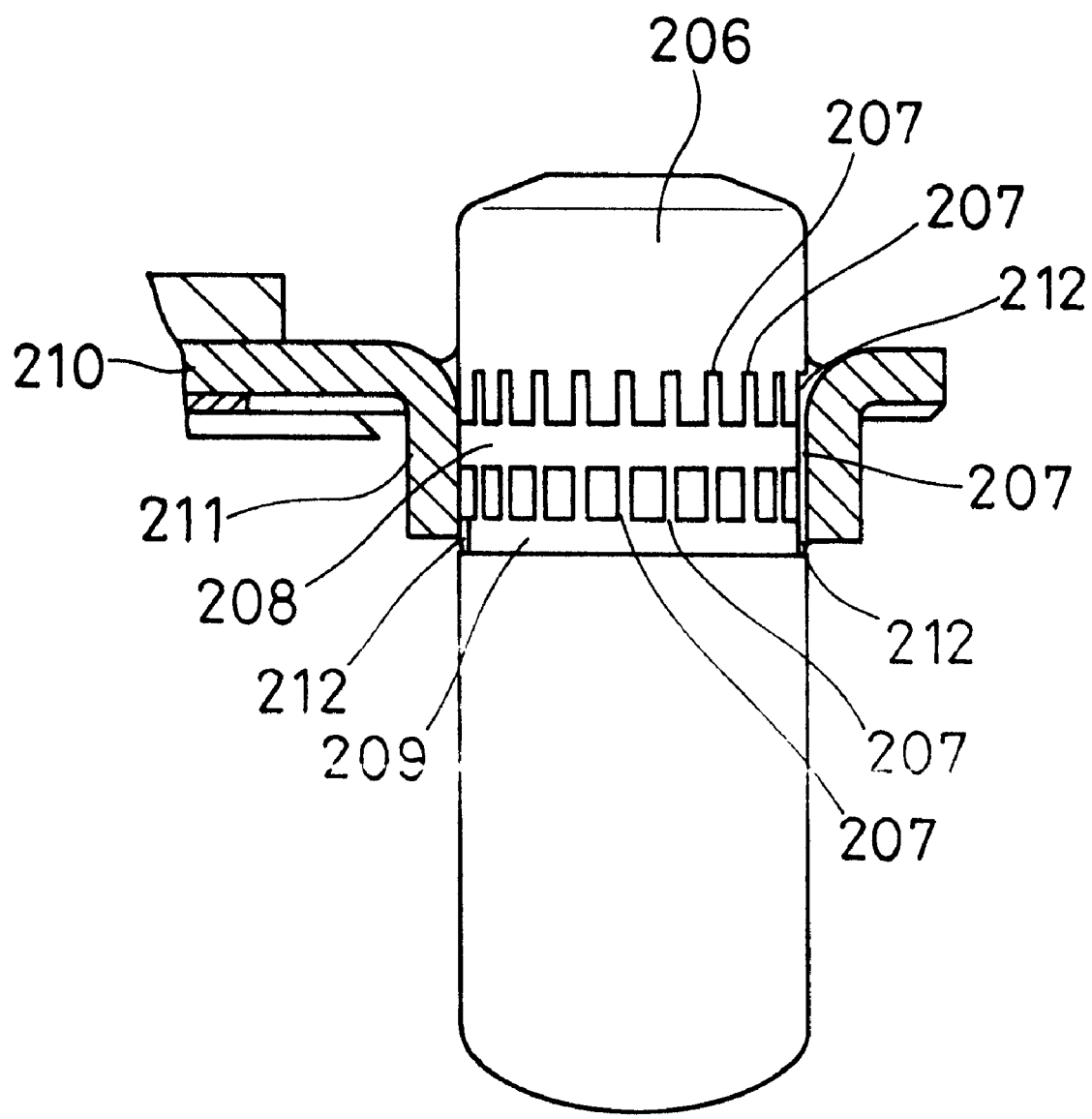
FIG. 40 is an enlarged explanatory drawing of a rotor case binding portion according to Modified Example 2 of Embodiment 5.

FIG. 40 is an enlarged explanatory drawing of a binding portion between a spindle and a rotor case showing Modified Example 2 of Embodiment 5. A spindle 206 has a plurality of vertical grooves 207 provided by means of knurling and two circumferential grooves 208, 209 provided by means of machining. The plurality of vertical grooves 207 are formed so as to link with the circumferential grooves 208, 209. When the rotor case 210 is press-fitted in the spindle 206, at least part of one 209 of the two circumferential grooves in the axial direction is exposed from the lower edge of the inner circumferential cylindrical portion 211, while at least part of the vertical grooves 207 in the axial direction is exposed from the upper edge of the inner circumferential cylindrical portion 211. Accordingly, the vertical grooves in the spindle 206 are linked with the inner circumferential cylindrical portion 211 from top to bottom via the circumferential grooves 208, 209. Consequently, after the press-fitting of the spindle in the rotor case, an adhesive 212 can be injected from the exposed side of the vertical grooves 207, that is, the upper part of FIG. 40 so as to be applied to the inner circumferential cylindrical portion 211 and the circumferential grooves 208, 209 in the spindle. Subsequently, both edges are irradiated with ultraviolet rays to harden the held adhesive.

Since an adhesive can be applied after press-fitting, it can be prevented from sticking to unwanted positions, thereby significantly facilitating the adhesion operation if a very small spindle or rotor case is used for a small thin spindle motor.

This configuration can reduce the distortion of the inner circumferential cylindrical portion 211 of the rotor case caused by press-fitting while reducing the inclination of the spindle and the deflection of the disc loading portion, thereby providing a spindle motor that has a reduced size and thickness and that allows the spindle to be reliably bind-fixed.

Figure 41:
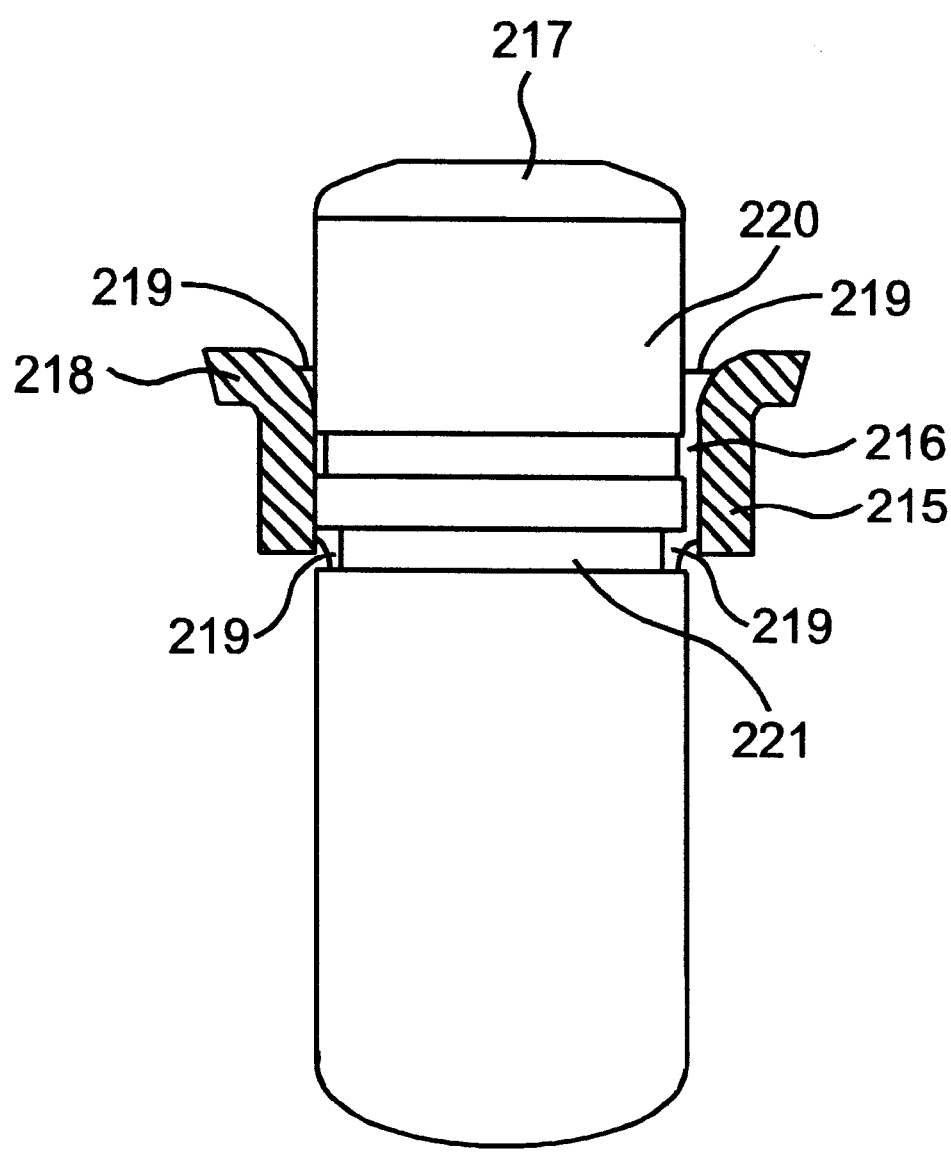
FIG. 41 is an enlarged explanatory drawing of a rotor case binding portion according to Modified Example 3 of Embodiment 5.

FIG. 41 is an enlarged explanatory drawing of a binding portion between a spindle and a rotor case according to Modified Example 3 of Embodiment 5. In terms of machining costs, providing vertical grooves in an inner circumferential cylindrical portion 215 of a rotor case is more advantageous than, for example, forming vertical grooves in a spindle by means of knurling.

In FIG. 41, vertical grooves 216 are provided in the inner circumferential cylindrical portion 215, and a gap formed between a spindle 217 and a rotor case 218 penetrates the inner circumferential cylindrical portion 215 from top to bottom.

After the rotor case 218 has been press-fitted on the spindle 217, an adhesive 219 is injected from the upper edge of the rotor case 218. Thus, the adhesive can be applied to the circumferential grooves 220, 221 to facilitate the adhesive application operation, thereby providing an inexpensive spindle motor that allows the spindle to be reliably bind-fixed.

Although the above embodiments have been described in conjunction with the example in which the spindle inner circumferential cylindrical portion 215 of the rotor case is formed by means of burring, this portion 215 may be a circular hole formed by means of pressing. Such an inner circumferential cylindrical portion is applicable as in the above embodiments by selecting an appropriate thickness for the rotor case and sizing to finish a portion of the rotor case corresponding to the inner circumferential cylindrical portion.

In addition, although the above embodiments have been described in conjunction with the aspect in which at least part of the circumferential groove 220, 221 or vertical groove 216 in the axial direction is exposed from the lower or upper edge of the inner circumferential cylindrical portion 215, these grooves may be exposed from the respective opposite edges as long as the spirits of the invention are not deviated from.

In addition, the above embodiments have been described in conjunction with the two circumferential grooves, one of which comprises an adhesion groove for obtaining an adhesion strength and the other of which comprises a housing groove with an extra adhesive housed therein. Of course, however, a plurality of adhesion grooves increase the spindle binding strength resulting from adhesion and a plurality of adhesive housing grooves enhance the effect of preventing an adhesive from flowing out to those positions other than the adhesion portions, thereby providing a spindle that allows the spindle to be reliably bind-fixed.

This invention is not limited to the above embodiments but may be applied and developed in various manners within the scope of the spirits of the invention.

What is claimed is:

1. A spindle motor comprising
   a rotor case having a first planar portion located on the inner circumferential side thereof and a second planar portion formed into a lower step at the outer circumference of said first planar portion;
   a hub receiving table disposed at the center of said first planar portion so that a disc is loaded on the hub receiving table;
   a spindle provided at the center of said hub receiving table;
   a driving pin disposed on the top surface of said rotor case near said spindle, said spindle and said driving pin cooperating in rotationally driving a disc;
   a driving magnet installed on the inside of an outer circumferentional portion of the rotor case; and
   a stator core placed inside said rotor case in such a way that the outer circumferential end of the stator core is opposed to said driving magnet, wherein
   (1) at least one weight is bind-fixed to a rear surface of the first planar portion of the rotor case,
   (2) said at least one weight is designed so that the center of total gravity of a disc hub and spindle motor rotation portion including the rotor case and the hub receiving table is located substantially on the central axis of the spindle, and
   (3) after conducting a balance tests, a hole is formed on the second planar portion of the rotor case to act as a minus weight to adjust precisely a position of the gravity center so that the position of the gravity center is located on the central axis of the spindle.

2. A spindle motor according to claim 1 wherein the weight bind-fixed to the rotor case is composed of a material of specific gravity 6 or more.

3. A spindle motor according to claim 1 wherein the hole is formed by means of punching.

4. A disc driving apparatus including a spindle motor comprising
   a rotor case having a first planar portion located on the inner circumferential side thereof and a second planar portion formed into a lower stop at the outer circumference of said first planar portion;

a hub receiving table disposed at the center of said first planar portion so that a disc is loaded on the hub receiving table;

a spindle provided at the centor of said hub receiving table;

a driving pin disposed on the top surface of said rotor case near said spindle, said spindle and said driving pin cooperating in rotationally driving a disc;

a driving magnet installed on the inside of an outer circumferentional portion of to rotor case; and a stator core placed inside said rotor case in such a way that the outer circumferential end of the stator core is opposed to said driving magnet, wherein (1) at least one weight is bind-fixed to a rear surface of the first planar portion of the rotor case, (2) said at least one weight is designed so that the center of total gravity of a disc hub and a spindle motor rotation portion including the rotor case and the hub receiving table is located substantially on the central axis of the spindle, and (3) after conducting a balance test, a hole is formed on the second planar portion of the rotor case to act as a minus weight to adjust precisely a position of the gravity center so at the position of the gravity center is located on the central axis of the spindle.

* * * * *